(12) United States Patent
Parthasarathy et al.

(10) Patent No.: US 7,013,353 B2
(45) Date of Patent: Mar. 14, 2006

(54) HOST-FABRIC ADAPTER HAVING AN EFFICIENT MULTI-TASKING PIPELINED INSTRUCTION EXECUTION MICRO-CONTROLLER SUBSYSTEM

(75) Inventors: Balaji Parthasarathy, Hillsboro, OR (US); Dominic J. Gasbarro, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 666 days.

(21) Appl. No.: 09/835,132

(22) Filed: Mar. 30, 2001

(65) Prior Publication Data

US 2002/0191599 A1 Dec. 19, 2002

(51) Int. Cl.
*G06F 3/00* (2006.01)

(52) U.S. Cl. .................. 710/7; 710/6; 710/20; 710/24

(58) Field of Classification Search ............. 709/211, 709/213–215, 212, 216; 710/7, 5–6, 20–21, 710/24, 62–64; 702/216
See application file for complete search history.

(56) References Cited

U.S. PATENT DOCUMENTS

| | | | |
|---|---|---|---|
| 5,457,681 A | * 10/1995 | Gaddis et al. ............. | 370/402 |
| 5,720,032 A | * 2/1998 | Picazo, Jr. et al. ......... | 709/250 |
| 6,625,768 B1 | 9/2003 | Reohr, Jr. et al. | |
| 6,775,719 B1 | 8/2004 | Leitner et al. | |
| 2002/0071450 A1 | 6/2002 | Gasbarro et al. | |
| 2002/0126705 A1 | * 9/2002 | Gentieu et al. ............ | 370/503 |
| 2002/0141424 A1 | 10/2002 | Gasbarro et al. | |
| 2002/0184392 A1 | 12/2002 | Parthasarathy et al. | |
| 2004/0151176 A1 | 8/2004 | Burton et al. | |
| 2004/0151177 A1 | 8/2004 | Burton et al. | |

OTHER PUBLICATIONS

Pending U.S. Appl. No. 09/671,707, entitled "Host–Fabric Adapter and Method of Connecting a Host System to a Channel–Based Switched Fabric in a Data Network", filed Sep. 28, 2000.

Pending U.S. Appl. No. 09/603,957, entitled "Device to Receive, Buffer, and Transmit Packets of Data in a Packet Switching Network", filed Jun. 26, 2000, P8329.

Pending U.S. Appl. No. 10/842,752, entitled "Device to Receive, Buffer, and Transmit Packets of Data in a Packet Switching Network", filed May 10, 2004, P8329C.

Pending U.S. Appl. No. 09/608,645, entitled "Memory Utilization in a Network Interface", filed Jun. 30, 2002, P8330.

Pending U.S. Appl. No. 09/669,670, entitled "Host–Fabric Adapter and Method of Connecting a Host System to a Channel–Based Switched Fabric in a Data Network", filed Sep. 26, 2000.

(Continued)

Primary Examiner—Richard L. Ellis
(74) Attorney, Agent, or Firm—Rob D. Anderson

(57) ABSTRACT

A host system is provided with one or more host-fabric adapters installed therein for connecting to a switched fabric of a data network. The host-fabric adapter may comprise at least one Micro-Engine (ME) arranged to establish connections and support data transfers, via a switched fabric, in response to work requests from a host system for data transfers; interface blocks arranged to interface the switched fabric and the host system, and send/receive work requests and/or data messages for data transfers, via the switched fabric, and configured to provide context information needed for said Micro-Engine (ME) to process work requests for data transfers, via the switched fabric, wherein the Micro-Engine (ME) is implemented with a pipelined instruction execution architecture to handle one or more ME instructions and/or one or more tasks in parallel in order to process data messages.

24 Claims, 16 Drawing Sheets

OTHER PUBLICATIONS

Pending U.S. Appl. No. 09/672,711, entitled Host–Fabric Adapter Having Hardware Assist Architechture and Method of Connecting a Host System to a Channel–Based filed Sep. 29, 2000.

Pending U.S. Appl. No. 09/698,188, entitled Host–Fabric Adapter Having Hardware Assist Architecture and Method of Connecting a Host System to a Channel–Based, filed Oct. 30, 2000.

* cited by examiner

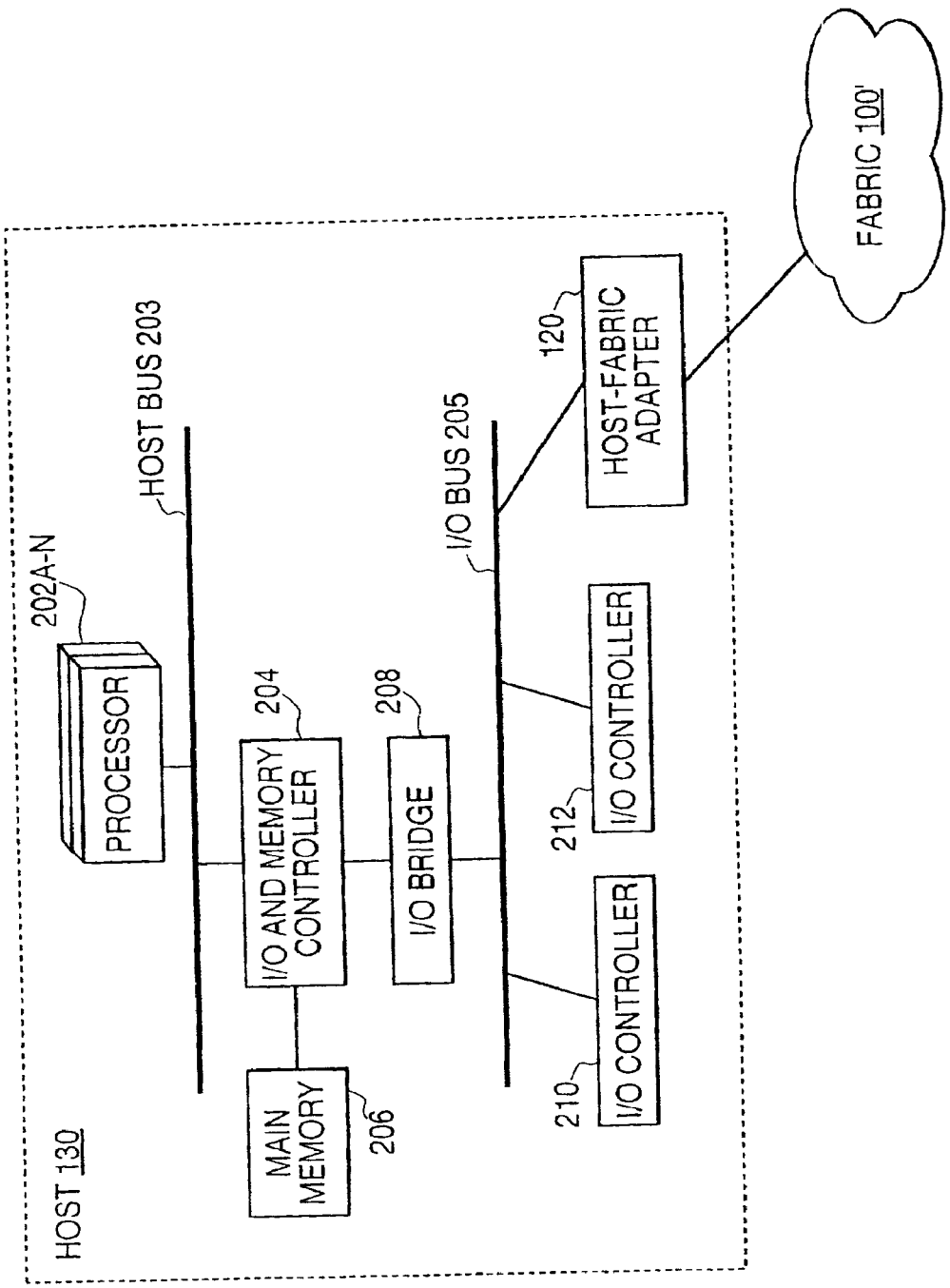

HOST-FABRIC ADAPTER HAVING AN EFFICIENT MULTI-TASKING PIPELINED INSTRUCTION EXECUTION MICRO-CONTROLLER SUBSYSTEM

TECHNICAL FIELD

The present invention relates to a data network, and more particularly, relates to a host-fabric adapter having an efficient multi-tasking pipelined instruction execution micro-controller subsystem for controlling data transactions in such a data network.

BACKGROUND

A data network generally consists of a network of multiple independent and clustered nodes connected by point-to-point links. Each node may be an intermediate node, such as a switch/switch element, a repeater, and a router, or an end-node within the network, such as a host system and an I/O unit (e.g., data servers, storage subsystems and network devices). Message data may be transmitted from source to destination, often through intermediate nodes.

Existing interconnect transport mechanisms, such as PCI (Peripheral Component Interconnect) buses as described in the "PCI Local Bus Specification, Revision 2.1" set forth by the PCI Special Interest Group (SIG) on Jun. 1, 1995, may be utilized to deliver message data to and from I/O devices, namely storage subsystems and network devices via a data network. However, PCI buses utilize a shared memory-mapped bus architecture that includes one or more shared I/O buses to deliver message data to and from storage subsystems and network devices. Shared I/O buses can pose serious performance limitations due to the bus arbitration required among storage and network peripherals as well as posing reliability, flexibility and scalability issues when additional storage and network peripherals are required. As a result, existing interconnect technologies have failed to keep pace with computer evolution and the increased demands generated and burden imposed on server clusters, application processing, and enterprise computing created by the rapid growth of the Internet.

Emerging solutions to the shortcomings of existing PCI bus architecture are InfiniBand™ and its predecessor, Next Generation I/O (NGIO) which have been developed by Intel Corp. and other companies to provide a standards-based I/O platform that uses a switched fabric and separate I/O channels instead of a shared memory-mapped bus architecture for reliable data transfers between end-nodes in a data network, as set forth in the "Next Generation Input/Output (NGIO) Specification," NGIO Forum on Jul. 20, 1999 and the "InfiniBand™ Architecture Specification," the InfiniBand™ Trade Association on Oct. 24, 2000. Using NGIO/InfiniBand™, a host system may communicate with one or more remote systems using a Virtual Interface (VI) architecture in compliance with the "Virtual Interface (VI) Architecture Specification, Version 1.0," as set forth by Compaq Corp., Intel Corp., and Microsoft Corp., on Dec. 16, 1997. NGIO/InfiniBand™ and VI hardware and software may often be used to support data transfers between two memory regions, typically on different systems over one or more designated channels. Each host system using a VI Architecture may contain "VIs", also known as work queues (WQ) formed in pairs in which work requests are posted to describe data movement operation and location of data to be moved for processing and/or transportation via a data network. Each host system may serve as a source (initiator) system which initiates a message data transfer (message send operation) or a target system of a message passing operation (message receive operation). Work requests submitted from a consumer that cause work instructions, called Work Queue Elements ("WQEs"), to be posted on work queues associated with a given network interface card for data transfer operations such as send/receive operations and remote direct memory access "RDMA" read/write operations. One or more channels between communication devices at host systems via a data network may be created and managed so that requested operations can be performed.

Since NGIO/InfiniBand™ is an emerging interconnect technology not yet in the marketplace, there is no known interface mechanism specifically implemented for NGIO/InfiniBand™ applications. More specifically, there is no known network interface card for a host system to connect to a data network using a channel-based, switched fabric architecture to support data movement operations between communication devices at a host system or between host systems or via a data network. Existing network interface cards for host systems are not adapted for emerging NGIO/InfiniBand™ interconnect technology and are, therefore, not optimized for NGIO/InfiniBand™ functionality.

Accordingly, there is a need for an especially designed, performance-driven host-fabric adapter installed at a host system in a data network for NGIO/InfiniBand™ applications. Also needed is an efficient multi-tasking pipelined instruction execution micro-controller subsystem for controlling data transactions in such a data network, via a channel-based switched fabric.

BRIEF DESCRIPTION OF THE DRAWINGS

A more complete appreciation of exemplary embodiments of the present invention, and many of the attendant advantages of the present invention, will be readily appreciated as the same becomes better understood by reference to the following detailed description when considered in conjunction with the accompanying drawings in which like reference symbols indicate the same or similar components, wherein:

FIGS. 4A–4B illustrate a block diagram of an example host system of an example data network according to different embodiments of the present invention;

DETAILED DESCRIPTION

The present invention is applicable for use with all types of data networks, I/O hardware adapters and chipsets, including follow-on chip designs which link together end stations such as computers, servers, peripherals, storage subsystems, and communication devices for data communications. Examples of such data networks may include a local area network (LAN), a wide area network (WAN), a campus area network (CAN), a metropolitan area network (MAN), a global area network (GAN), a wireless personal area network (WPAN), and a system area network (SAN), including newly developed computer networks using Next Generation I/O (NGIO), Future I/O (FIO), InfiniBand™ and those networks including channel-based, switched fabric architectures which may become available as computer technology advances to provide scalable performance. LAN systems may include Ethernet, FDDI (Fiber Distributed Data Interface) Token Ring LAN, Asynchronous Transfer Mode (ATM) LAN, Fiber Channel, and Wireless LAN. However, for the sake of simplicity, discussions will concentrate mainly on a host system including one or more hardware fabric adapters for providing physical links for channel connections in a simple data network having several example nodes (e.g., computers, servers and I/O units) interconnected by corresponding links and switches, although the scope of the present invention is not limited thereto.

Figure 1:
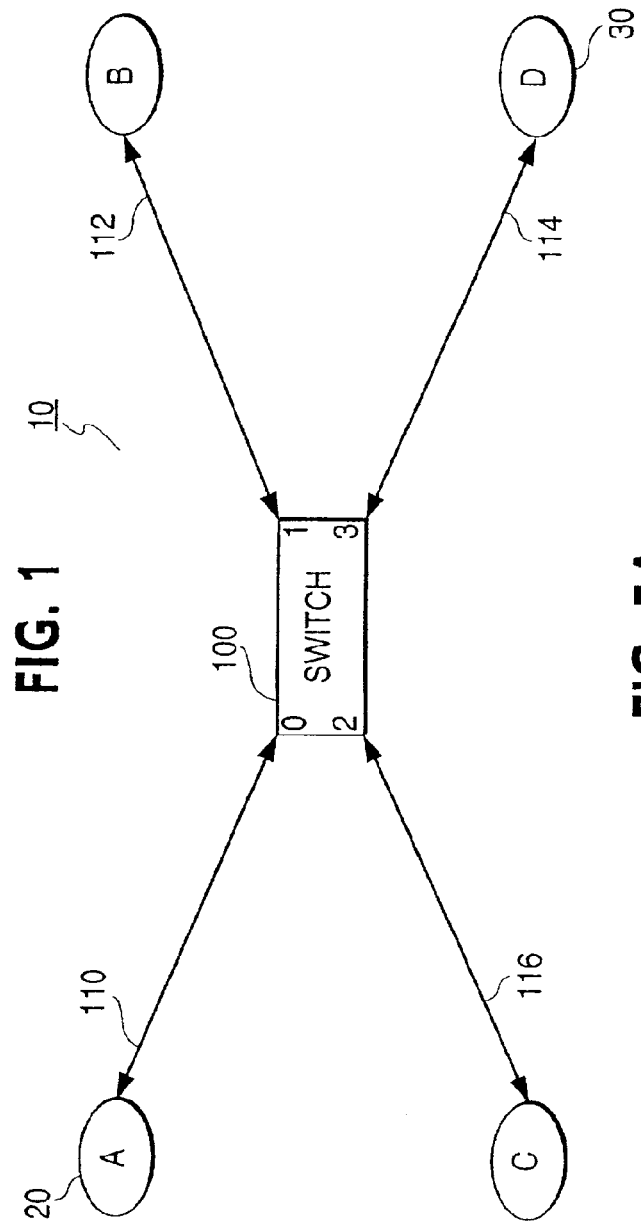
FIG. 1 illustrates an example data network having several nodes interconnected by corresponding links of a basic switch according to an embodiment of the present invention.

Attention now is directed to the drawings and particularly to FIG. 1, in which a simple data network 10 having several interconnected nodes for data communications according to an embodiment of the present invention is illustrated. As shown in FIG. 1, the data network 10 may include, for example, one or more centralized switches 100 and four different nodes A, B, C, and D. Each node (endpoint) may correspond to one or more I/O units and host systems including computers and/or servers on which a variety of applications or services are provided. I/O unit may include one or more processors, memory, one or more I/O controllers and other local I/O resources connected thereto, and can range in complexity from a single I/O device such as a local area network (LAN) adapter to large memory rich RAID subsystem. Each I/O controller (IOC) provides an I/O service or I/O function, and may operate to control one or more I/O devices such as storage devices (e.g., hard disk drive and tape drive) locally or remotely via a local area network (LAN) or a wide area network (WAN), for example.

The centralized switch 100 may contain, for example, switch ports 0, 1, 2, and 3 each connected to a corresponding node of the four different nodes A, B, C, and D via a corresponding physical link 110, 112, 114, and 116. Each physical link may support a number of logical point-to-point channels. Each channel may be a bi-directional communication path for allowing commands and data to flow between two connected nodes (e.g., host systems, switch/switch elements, and I/O units) within the network.

Each channel may refer to a single point-to-point connection where data may be transferred between endpoints (e.g., host systems and I/O units). The centralized switch 100 may also contain routing information using, for example, explicit routing and/or destination address routing for routing data from a source node (data transmitter) to a target node (data receiver) via corresponding link(s), and re-routing information for redundancy.

The specific number and configuration of endpoints or end stations (e.g., host systems and I/O units), switches and links shown in FIG. 1 is provided simply as an example data network. A wide variety of implementations and arrangements of a number of end stations (e.g., host systems and I/O units), switches and links in all types of data networks may be possible.

According to an example embodiment or implementation, the endpoints or end stations (e.g., host systems and I/O units) of the example data network shown in FIG. 1 may be compatible with the *"Next Generation Input/Output (NGIO) Specification"* as set forth by the NGIO Forum on Jul. 20, 1999, and the *"InfiniBand™ Architecture Specification"* as set forth by the InfiniBand™ Trade Association scheduled for publication in late October 2000. According to the NGIO/InfiniBand™ Specification, the switch 100 may be an NGIO/InfiniBand™ switched fabric (e.g., collection of links, routers, switches and/or switch elements connecting a number of host systems and I/O units), and the endpoint may be a host system including one or more host channel adapters (HCAs), or a remote system such as an I/O unit including one or more target channel adapters (TCAs). Both the host channel adapter (HCA) and the target channel adapter (TCA) may be broadly considered as fabric adapters provided to interface endpoints to the NGIO switched fabric, and may be implemented in compliance with *"Next Generation I/O Link Architecture Specification: HCA Specification, Revision 1.0"* as set forth by NGIO Forum on May 13, 1999, and/or the *InfiniBand™ Specification* for enabling the endpoints (nodes) to communicate to each other over an NGIO/InfiniBand™ channel(s) with minimum data transfer rates of up to 2.5 gigabit per second (Gbps), for example.

Figure 2:
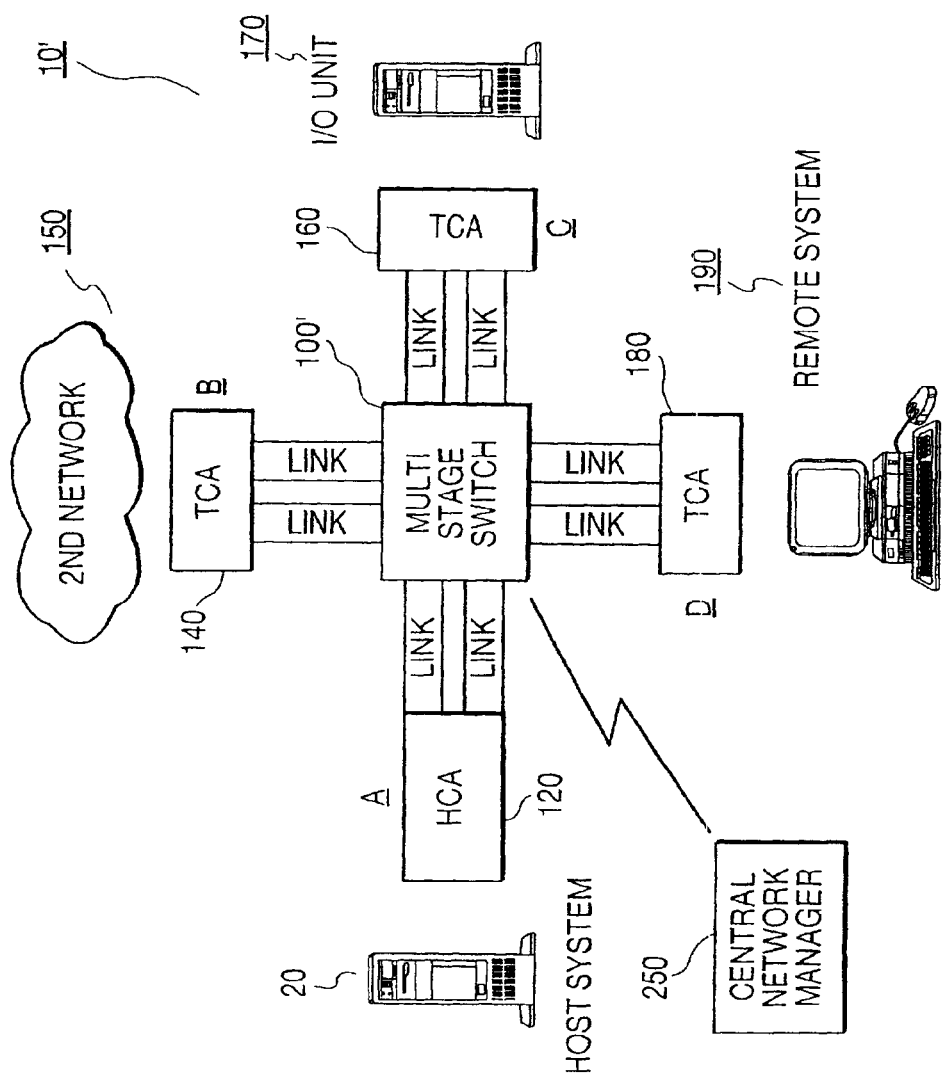
FIG. 2 illustrates another example data network having several nodes interconnected by corresponding links of a multi-stage switched fabric according to an embodiment of the present invention.

For example, FIG. 2 illustrates an example data network (i.e., system area network SAN) 10' using an NGIO/InfiniBand™ architecture to transfer message data from a source node to a destination node according to an embodiment of the present invention. As shown in FIG. 2, the data network 10' includes an NGIO/InfiniBand™ switched fabric 100' (multi-stage switched fabric comprised of a plurality of switches) for allowing a host system and a remote system to communicate to a large number of other host systems and remote systems over one or more designated channels. A channel connection is simply an abstraction that is established over a switched fabric 100' to allow two work queue pairs (WQPs) at source and destination endpoints (e.g., host and remote systems, and IO units that are connected to the switched fabric 100') to communicate to each other. Each channel can support one of several different connection semantics. Physically, a channel may be bound to a hardware port of a host system. Each channel may be acknowledged or unacknowledged. Acknowledged channels may provide reliable transmission of messages and data as well as information about errors detected at the remote end of the channel. Typically, a single channel between the host system and any one of the remote systems may be sufficient but data transfer spread between adjacent ports can decrease latency and increase bandwidth. Therefore, separate channels for separate control flow and data flow may be desired. For example, one channel may be created for sending request and reply messages. A separate channel or set of channels may be created for moving data between the host system and any one of the remote systems. In addition, any number of end stations, switches and links may be used for relaying data in groups of packets between the end stations and switches via corresponding NGIO/InfiniBand™ links.

For example, node A may represent a host system 130 such as a host computer or a host server on which a variety of applications or services are provided. Similarly, node B may represent another network 150, including, but may not be limited to, local area network (LAN), wide area network (WAN), Ethernet, ATM and fibre channel network, that is connected via high speed serial links. Node C may represent an I/O unit 170, including one or more I/O controllers and I/O units connected thereto. Likewise, node D may represent a remote system 190 such as a target computer or a target server on which a variety of applications or services are provided. Alternatively, nodes A, B, C, and D may also represent individual switches of the NGIO/InfiniBand™ switched fabric 100' which serve as intermediate nodes between the host system 130 and the remote systems 150, 170 and 190.

The multi-stage switched fabric 100' may include a fabric manager 250 connected to all the switches for managing all network management functions. However, the fabric manager 250 may alternatively be incorporated as part of either the host system 130, the second network 150, the I/O unit 170, or the remote system 190 for managing all network management functions. In either situation, the fabric manager 250 may be configured for learning network topology, determining the switch table or forwarding database, detecting and managing faults or link failures in the network and performing other network management functions.

Host channel adapter (HCA) 120 may be used to provide an interface between a memory controller (not shown) of the host system 130 (e.g., servers) and a switched fabric 100' via high speed serial NGIO/InfiniBand' links. Similarly, target channel adapters (TCA) 140 and 160 may be used to provide an interface between the multi-stage switched fabric 100' and an I/O controller (e.g., storage and networking devices) of either a second network 150 or an I/O unit 170 via high speed serial NGIO/InfiniBand™ links. Separately, another target channel adapter (TCA) 180 may be used to provide an interface between a memory controller (not shown) of the remote system 190 and the switched fabric 100' via high speed serial NGIO/InfiniBand™ links. Both the host channel adapter (HCA) and the target channel adapter (TCA) may be broadly considered as fabric adapters provided to interface either the host system 130 or any one of the remote systems 150, 170 and 190 to the switched fabric 100', and may be implemented in compliance with *"Next Generation I/O Link Architecture Specification: HCA Specification, Revision 1.0"* as set forth by NGIO Forum on May 13, 1999 for enabling the endpoints (nodes) to communicate to each other over an NGIO/InfiniBand™ channel(s). However, NGIO/InfiniBand™ is merely one example embodiment or implementation of the present invention, and the invention is not limited thereto. Rather, the present invention may be applicable to a wide variety of any number of data networks, hosts and I/O units. For example, practice of the invention may also be made with Future Input/Output (FIO). FIO specifications have not yet been released, owing to subsequent merger agreement of NGIO and FIO factions combine efforts on InfiniBand™ Architecture specifications as set forth by the InfiniBand Trade Association (formed Aug. 27, 1999) having an Internet address of "http://www.InfiniBandta.org."

Figure 3A:
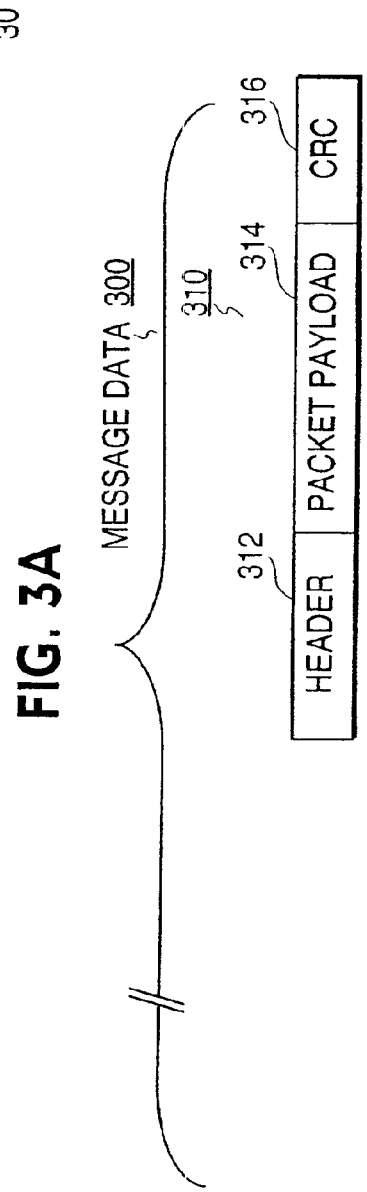
FIGS. 3A–3D illustrate packet formats of data transmitted from a source node to a destination node and descriptors posted in an example data network according to an embodiment of the present invention.
Figure 3B:
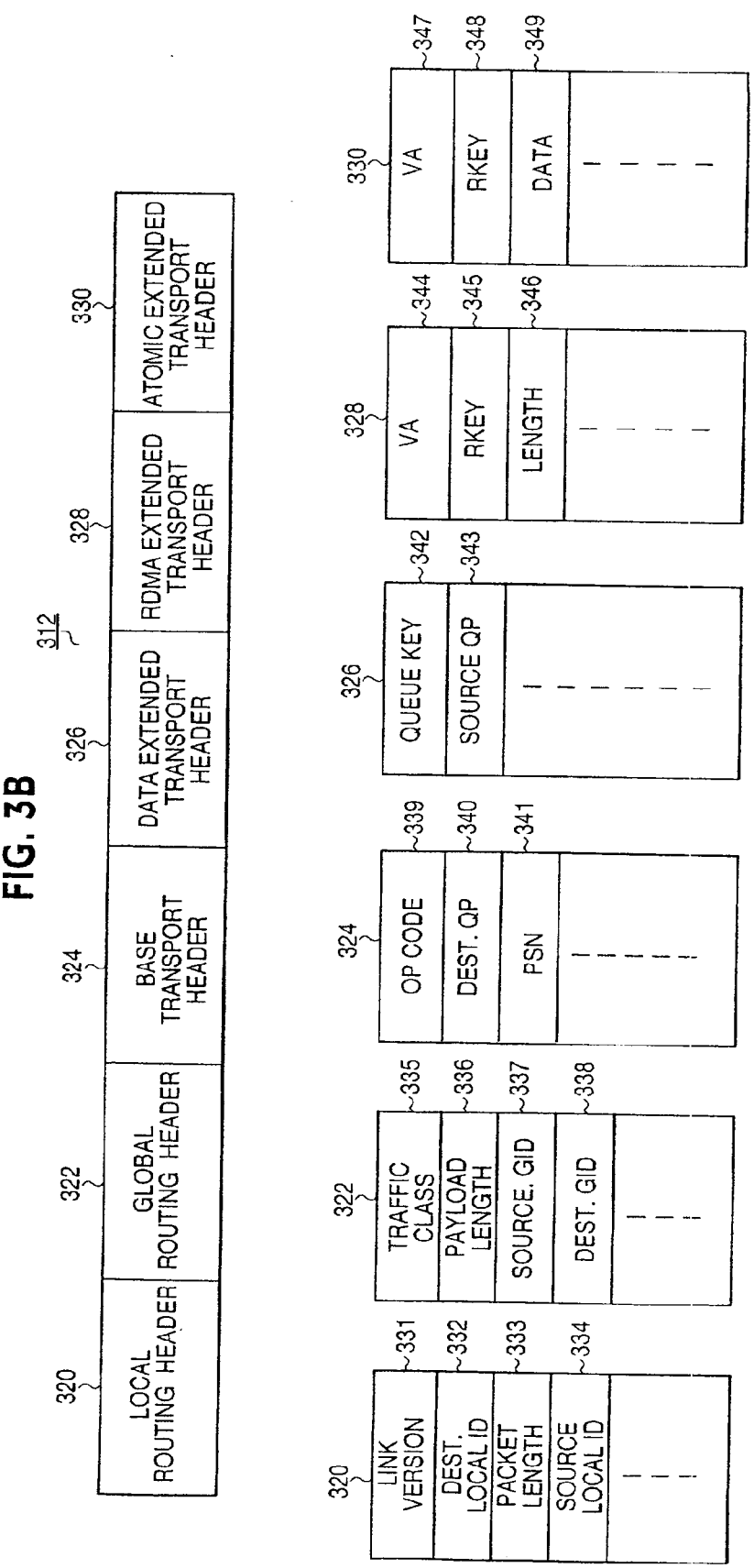

FIGS. 3A–3B illustrate an embodiment of packet formats of message data transmitted from a source node (data transmitter) to a destination node (data receiver) through switches and/or intermediate nodes according to the *"Infini-Band™ Architecture Specification"* as set forth by the InfiniBand™ Trade Association on Oct. 24, 2000. As shown in FIG. 3A, a message data 300 may represent a sequence of one or more data packets 310 (typically derived from data transfer size defined by a work request). Each packet 310 may include a header information 312, a variable format packet payload 314 and a cyclic redundancy check (CRC) information 316. Under the *"Next Generation Input/Output (NGIO) Specification"* as previously set forth by the NGIO Forum on Jul. 20, 1999, the same data packets may be referred to as data cells having similar header information as the least common denominator (LCD) of message data. However, NGIO header information may be less inclusive than InfiniBand™ header information. Nevertheless, for purposes of this disclosure, data packets are described herein below via InfiniBand™ protocols but are also interchangeable with data cells via NGIO protocols.

The header information 312 according to the InfiniBand™ specification may include, as shown in FIG. 3B, different types of headers, including: for example, a local routing header 320, a global routing header 322, a base transport header 324 and extended transport headers such as data extended transport header 326, a RDMA extended transport header 328, and an Atomic extended transport header 330.

The local routing header 320 contains fields used for local routing by switches within the example data network 10' shown in FIG. 2. For example, the local routing header 320 may include, but not limited to, a link version field 331 used to identify the InfiniBand™ link level protocols, a destination local ID field 332 used to identify the destination port and data path in the data network 10'; a packet length field 333 used to identify the size of the data packet; and a source local ID 334 used to identify the source port (injection point).

The global routing header 322 contains fields used for routing data packets between nodes of the example data network 10' shown in FIG. 2. For example, the global routing header 322 may include, but not limited to, a traffic class field 335 used for communication with global service level; a payload length field 336 used to indicate the length of the packet in bytes; a source GID field 333 used to identify the global identifier (GID) for the port which injected the packet into the data network 10'; and a destination GID field 338 used to identify the GID for the port which will consume the packet from the data network 10'.

The base transport header 324 contains fields used for data message transports within the data network 10' shown in FIG. 2. For example, the base transport header 324 may include, but not limited to, an OpCode field 339 used to indicate the packet type, identify if the packet is the first, last, immediate or only packet of a data message and specifies the operation (Send, RDMA Write, RDMA Read, Atomic); a destination QP field 340 used to indicate the Work Queue Pair (WQP) number at the destination; a packet sequence number (PSN) field 341 used to detect a missing or duplicate packet.

The data extended transport header 326 contains additional transport fields for datagram service. For example, the data extended transport header 326 may include, but not limited to, a Queue Key (Q_Key) field 342 used to authorize access to the receive queue; and a source QP field 343 used to indicate the WQP number at the source.

The RDMA extended transport header 328 contains additional transport fields for RDMA operations. For example, the RDMA extended transport header 328 may include, but not limited to, a Virtual Address (VA) field 344 used to provide the Virtual Address of the RDMA operation; a Remote Key (Rkey) field 345 used to authorize access for the RDMA operation; and a length field 346 used to indicate the length (in bytes) for the direct memory access operation.

The Atomic extended transport header 330 contains additional transport fields for atomic packets and atomic operations. For example, the Atomic extended transport header 330 may include, but not limited to, a Virtual Address (VA) field 347 used to provide the remote Virtual Address, a Remote Key (Rkey) field 348 used to authorize access to the remote Virtual Address; and a swap and compare data field 349 used to provide operands in atomic operations.

Work requests submitted by a consumer in a form of Work Queue Elements "WQEs" are posted onto appropriate work queues (WQs) from the host system 130 to describe data movement operation and location of data to be moved for processing and/or transportation, via the switched fabric 100'. Such "WQEs" typically provide all the information needed to complete send queue and receive queue operations.

There may be several classes of send queue operations, including Send, Remote Memory Access (RDMA), and Memory Binding. For a Send operation, the WQE specifies a block of data in the consumer's memory space for the hardware to send to the destination, letting a receive WQE already queued at the destination specify where to place that data. For an RDMA operation, the WQE also specifies the address in the remote consumer's memory. Thus an RDMA operation does not need to involve the receive work queue of the destination.

There are three types of RDMA operations, RMDA-Write, RDMA-Read, and Atomic. The RDMA-Write operation stipulates that the hardware is to transfer data from the consumer's memory to the remote consumer's memory. The RDMA-Read operation stipulates that the hardware is to transfer data from the remote memory to the consumer's memory. The Atomic operation stipulates that the hardware is to perform a read of a remote memory location. The remote system returns the value read, and conditionally modifies/replaces the remote memory contents by writing an updated value back to the same location. In other words, the Atomic operation is a combined Read, Modify, and Write operation. An example of an Atomic operation is the Compare and Swap if Equal operation. The WQE specifies a remote memory location, a compare value, and a new value. The remote WQP reads the specified memory location, compares that value to the compare value supplied in the message, and only if those values are equal, then the WQP writes the new value to the same memory location. In either case the remote WQP returns the value it read from the memory location to the requesting WQP. The other Atomic operation is the FetchAdd operation where the remote WQP reads the specified memory location, returns that value to the requesting WQP, adds to that value a value supplied in the message, and then writes the result to that same memory location.

The Memory Bind instructs the hardware to alter memory registration relationships and change the binding of a Memory Window. The Bind Memory Window operation associates a previously allocated Memory Window to a specified address range within an existing Memory Region, along with a specified set of remote access privileges.

There may be only one receive queue operation and it is to specify a receive data buffer. A Receive WQE specifies where the hardware is to place data received from another consumer when that consumer executes a Send operation. Each time the remote consumer successfully executes a Send operation, the hardware takes the next entry from the receive queue, places the received data in the memory location specified in that receive WQE, and places a completion queue entry on the completion queue (CQ) indicating to the consumer that the receive operation has completed. Thus the execution of a Send operation causes a receive queue operation at the remote consumer.

Each Send/Receive WQE may be utilized to control the transmission or reception of a single data packet. Send "WQEs" and RDMA Write "WQEs" additionally provide a "gather" list describing the virtual addresses to fetch outgoing data from local system memory 206 (that is to describe exactly where to fetch outgoing data from local system memory 206). Receive "WQEs" and RDMA Read "WQEs" alternately provide a "scatter" list describing the virtual addresses to place incoming data in local system memory 206 (that is to describe exactly where to store incoming data within local system memory 206). Send "WQEs" are valid only on Send Work Queue chains. In contrast, receive "WQEs" are valid only on Receive Work Queue chains.

RDMA "WQEs" are a superset of Send/Receive "WQEs", and may contain additional information indicating the remote address of information transferred. Unlike Send/Receive operations where the remote system is also using a work request to determine where to transfer message data to or from, RDMA "WQEs" specifically instruct the remote system where to transfer the message data to or from, via the use of Virtual Address (VA), Memory Handle (MH) and Remote Key sent to the remote system. Remote Key may be used for virtual to physical address translations at the remote system.

Typically, each "WQE" may begin with a control segment followed by an optional address segment and an arbitrary number of data segments. Control segments may contain control and status information. Address segments, for read/write RDMA operations, may contain remote buffer information (i.e., memory associated with the VI targeted to receive the read/write request). Data segments, for both send/receive and read/write RDMA operations, may contain information about the local system memory 206 (i.e., memory associated with the VI issuing the send/receive or read/write request).

Figure 3C:
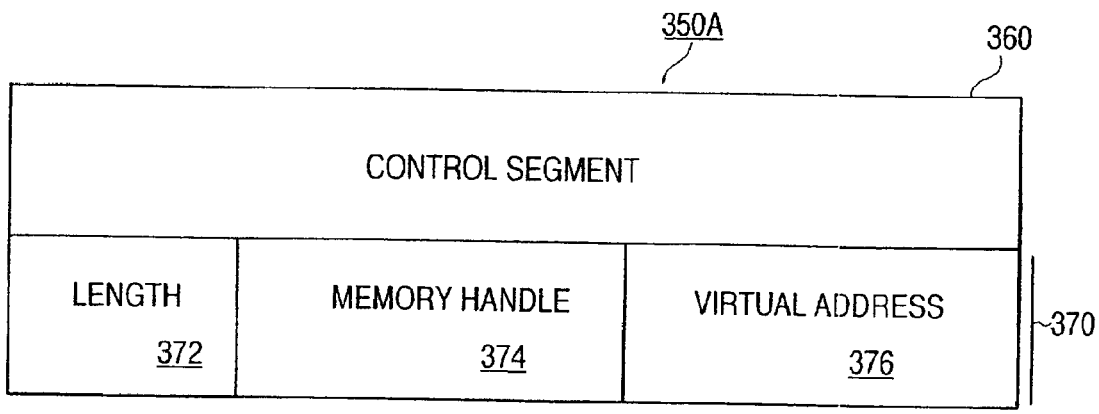
Figure 3D:
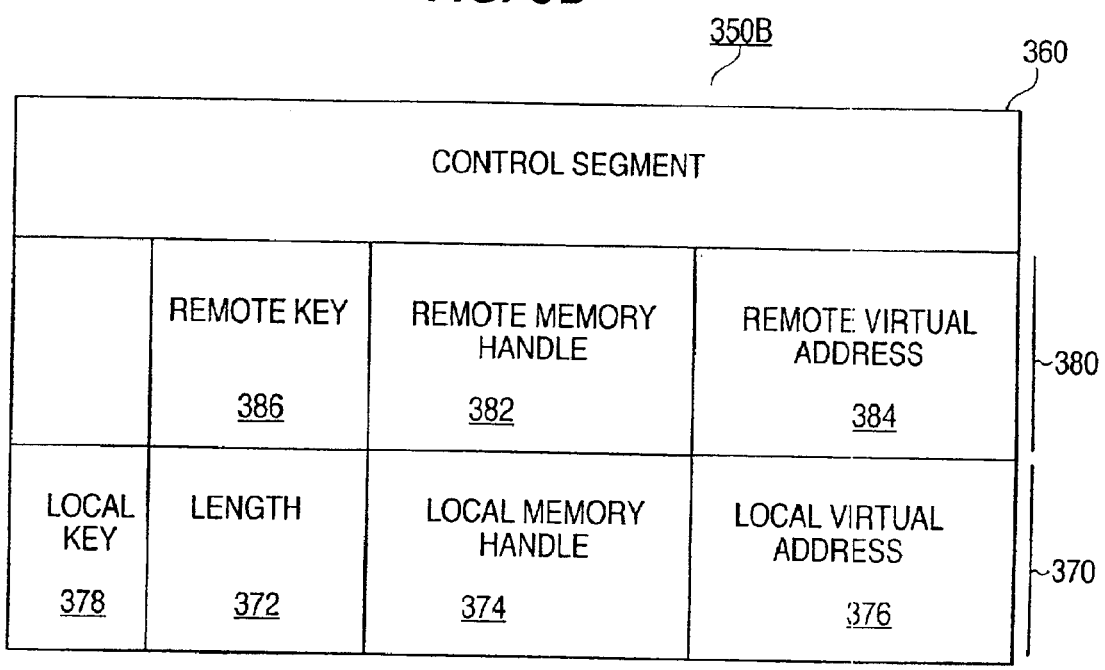

FIGS. 3C–3D illustrate an example Send/Receive type "WQE" 350A and an example Read/Write RDMA type "WQE" 350B respectively according to an embodiment of the present invention. As shown in FIG. 3C, the Send/

Receive "WQE" 350A may comprise a control segment 360 and a data segment 370 which includes a segment length field 372, a memory handle field 374, and a virtual address field 376. Segment length 372 specifies the length of the message data to be sent or that is to be received. Memory Handle (MH) 374 may be used to verify that the sending/requesting process (i.e., VI) owns the registered memory region indicated by segment length 372 and Virtual Address (VA) 376. In addition, Local Key 378 may be included to perform a locally generated virtual address to physical address translation. For a send operation, Virtual Address (VA) 376 identifies the starting memory location of the message data to be sent in the sending VI's local memory space. For a receive operation, Virtual Address (VA) 376 identifies the starting memory location of where the received message data is to be stored in the requesting VI's local memory space.

As shown in FIG. 3D, the Read/Write RDMA "WQE" 350B may comprise a control segment 360, an address segment 380, and a data segment 370. Address segment 380 may contain a remote memory handle field 382 and a remote virtual address field 384. Data segment 370 may contain a segment length field 372, a local memory handle field 374, and a local virtual address field 376. In addition, Local Key 378 may be included to perform a locally generated virtual address to physical address translation. Remote Key ("Rkey") 386 may also be included to perform a remotely generated virtual address to physical address translation at the remote system. More specifically, remote Key 386 refers to a Memory Region or Memory Window used with a virtual address to identify the appropriate page of local system memory 206 for the remote system to access local system memory 206.

For a RDMA read operation, remote Virtual Address (VA) 384 identifies the memory location in the remote process' memory space, of the message data to be read. Local Virtual Address (VA) 376 identifies the starting memory location in the local process' memory space of where the received message is to be placed. The amount of memory to be used to store the message data may be specified by segment length field 372. For a RDMA write operation, remote Virtual Address (VA) 384 identifies the memory location in the remote process' memory space of the message data to be written. Local Virtual Address (VA) 376 identifies the starting memory location in the local process' memory space of where the message data for the packet to be transferred is read from. The size of the message data is specified by segment length field 372. Remote Memory Handle (MH) 382 corresponds to the Memory Handle (MH) associated with the memory identified by remote Virtual Address (VA) 384. Local Memory Handle 374 corresponds to the Memory Handle (MH) associated with the memory identified by local Virtual Address 376.

Returning to discussion, one example embodiment of a host system 130 may be shown in FIG. 4A. Referring to FIG. 4A, the host system 130 may include one or more processors 202A–202N coupled to a host bus 203. Each of the multiple processors 202A–202N may operate on a single item (I/O operation), and all of the multiple processors 202A–202N may operate on multiple items on a list at the same time. An I/O and memory controller 204 (or chipset) may be connected to the host bus 203. A main memory 206 may be connected to the I/O and memory controller 204. An I/O bridge 208 may operate to bridge or interface between the I/O and memory controller 204 and an I/O bus 205. Several I/O controllers may be attached to I/O bus 205, including an I/O controllers 210 and 212. I/O controllers 210 and 212 (including any I/O devices connected thereto) may provide bus-based I/O resources.

One or more host-fabric adapters 120 may also be connected to the I/O bus 205. Alternatively, one or more host-fabric adapters 120 may be connected directly to the I/O and memory controller (or chipset) 204 to avoid the inherent limitations of the I/O bus 205 as shown in FIG. 4B, In either embodiment shown in FIGS. 4A–4B, one or more host-fabric adapters 120 may be provided to interface the host system 130 to the NGIO/InfiniBand™ switched fabric 100'.

Figure 4B:
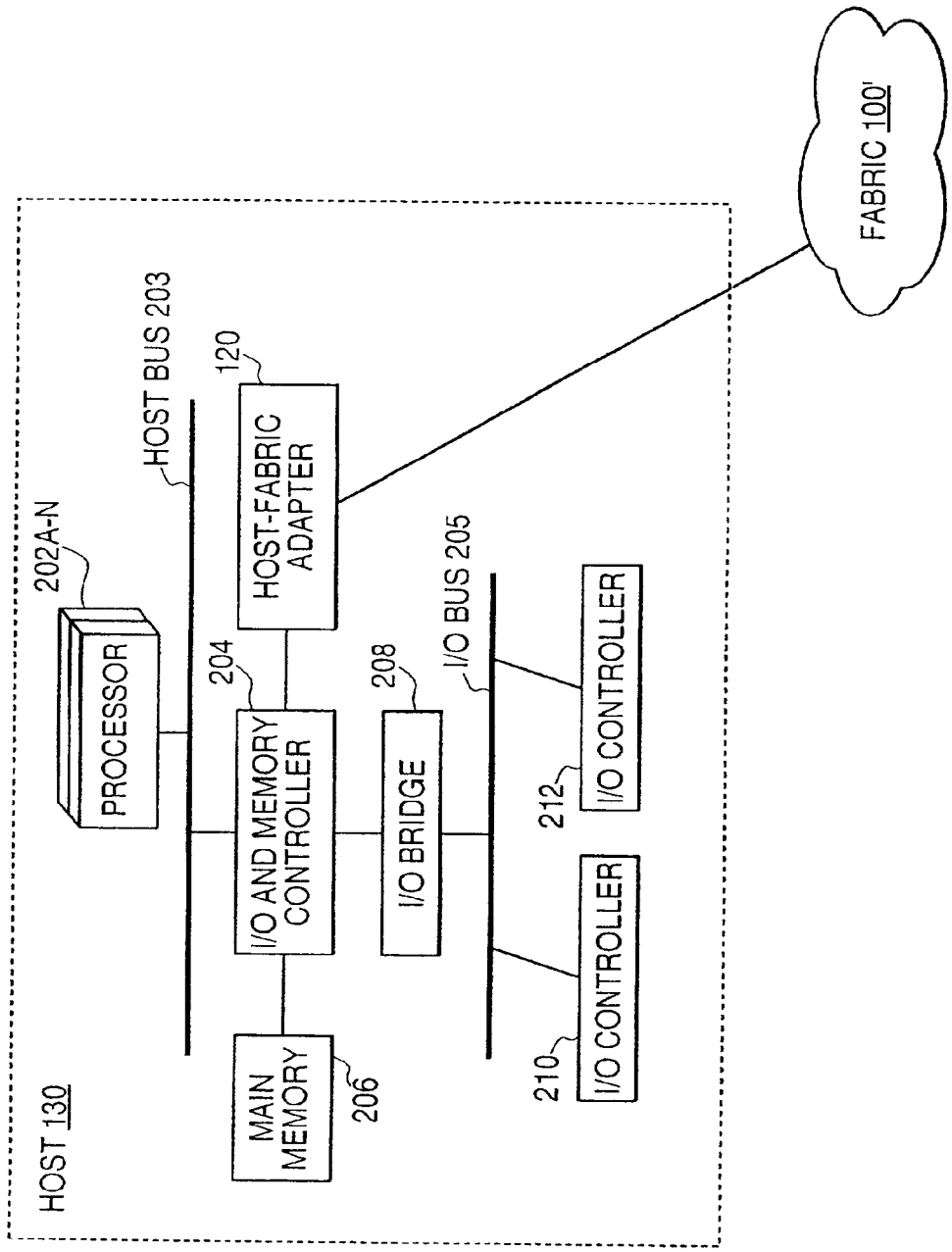

FIGS. 4A–4B merely illustrate example embodiments of a host system 130. A wide array of system configurations of such a host system 130 may be available. A software driver stack for the host-fabric adapter 120 may also be provided to allow the host system 130 to exchange message data with one or more remote systems 150, 170 and 190 via the NGIO/InfiniBand™ switched fabric 100', while preferably being compatible with many currently available operating systems, such as Windows 2000.

Figure 5:
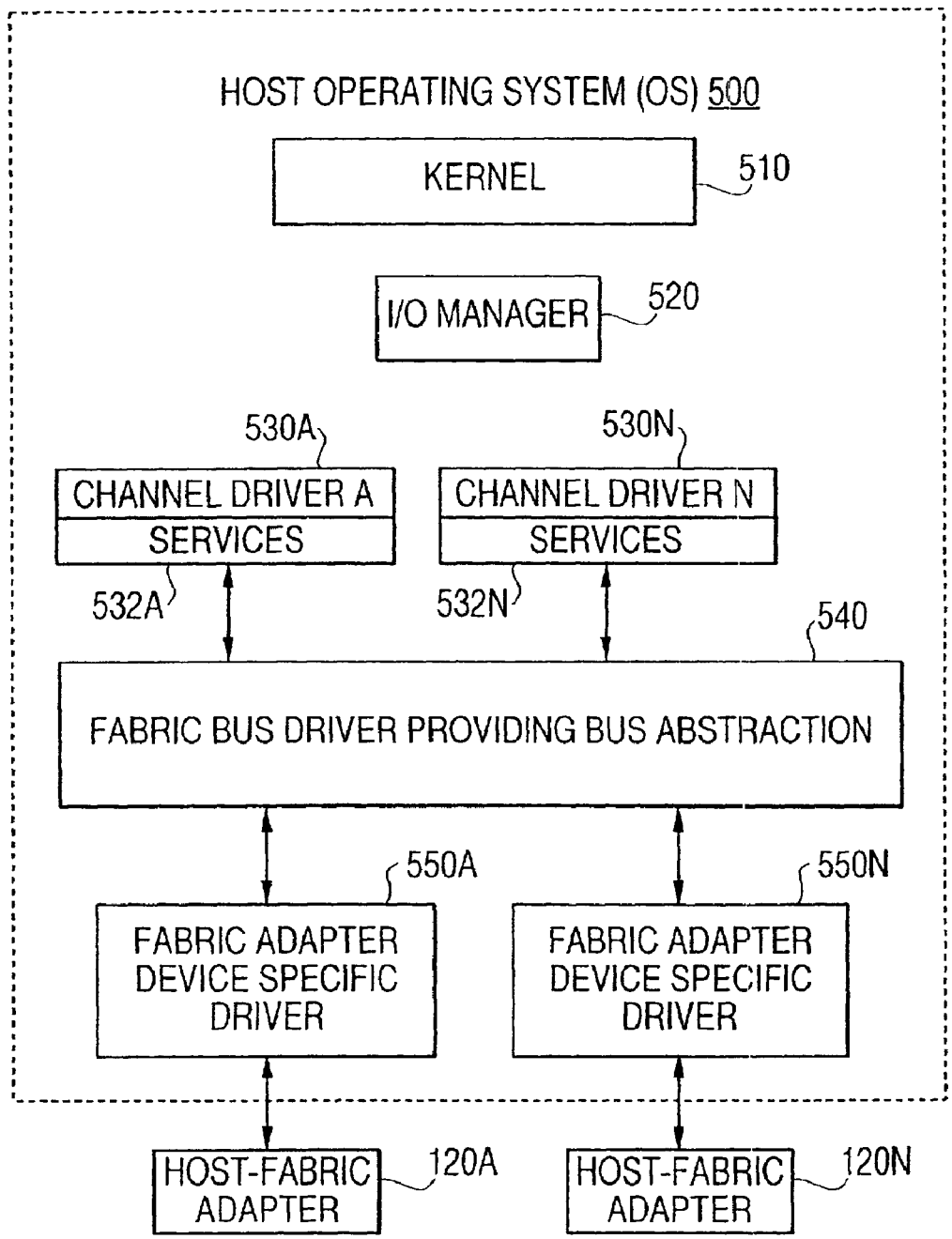
FIG. 5 illustrates an example software driver stack of an operating system (OS) of a host system according to an embodiment of the present invention.

FIG. 5 illustrates an example software driver stack of a host system 130. As shown in FIG. 5, a host operating system (OS) 500 may include a kernel 510, an I/O manager 520, a plurality of channel drivers 530A–530N for providing an interface to various I/O controllers, and a host-fabric adapter software stack (driver module) including a fabric bus driver 540 and one or more fabric adapter device-specific drivers 550A–550N utilized to establish communication with devices attached to the switched fabric 100' (e.g., I/O controllers), and perform functions common to most drivers. Such a host operating system (OS) 500 may be Windows 2000, for example, and the I/O manager 520 may be a Plug-n-Play manager.

Channel drivers 530A–530N provide the abstraction necessary to the host operating system (OS) to perform IO operations to devices attached to the switched fabric 100', and encapsulate IO requests from the host operating system (OS) and send the same to the attached device(s) across the switched fabric 100'. In addition, the channel drivers 530A–530N also allocate necessary resources such as memory and Work Queues (WQ) pairs, to post work items to fabric-attached devices.

The host-fabric adapter software stack (driver module) may be provided to access the switched fabric 100' and information about fabric configuration, fabric topology and connection information. Such a host-fabric adapter software stack (driver module) may be utilized to establish communication with a remote system (e.g., I/O controller), and perform functions common to most drivers, including, for example, host-fabric adapter initialization and configuration, channel configuration, channel abstraction, resource management, fabric management service and operations, send/receive IO transaction messages, remote direct memory access (RDMA) transactions (e.g., read and write operations), queue management, memory registration, descriptor management, message flow control, and transient error handling and recovery. Such a host software module may be written using high-level programming languages such as C, C++ and Visual Basic, and may be provided on a computer tangible medium, such as memory devices; magnetic disks (fixed, floppy, and removable); other magnetic media such as magnetic tapes; optical media such as CD-ROM disks, or via Internet downloads, which may be available for a fabric administrator to conveniently plug-in or download into an existing operating system (OS). Such a host software module may also be bundled with the existing operating system (OS) which may be activated by a particular device driver.

The host-fabric adapter (otherwise, known as host channel adapter "HCA") driver module may consist of three functional layers: a HCA services layer (HSL), a HCA abstraction layer (HCAAL), and a HCA device-specific driver (HDSD) in compliance with the *"Next Generation I/O Architecture: Host Channel Adapter Software Specification"*, the *"Next Generation I/O: Intel HCA Connection Services Layer High Level Design"*, the *"Next Generation I/O: Intel HCA Abstraction Layer High Level Design"*, and the *"Next Generation I/O: Intel HCA Fabric Services Layer High Level Design"* as set forth by Intel on Aug. 6, 1999 For instance, inherent to all channel drivers 530A–530N may be a Channel Access Layer (CAL) including a HCA Service Layer (HSL) for providing a set of common services 532A–532N, including fabric services, connection services, and HCA services required by the channel drivers 530A–530N to instantiate and use NGIO/InfiniBand™ protocols for performing data transfers over NGIO/InfiniBand™ channels. The fabric bus driver 540 may correspond to the HCA Abstraction Layer (HCAAL) for managing all of the device-specific drivers, controlling shared resources common to all HCAs in a host system 130 and resources specific to each HCA in a host system 130, distributing event information to the HSL and controlling access to specific device functions. Likewise, one or more fabric adapter device-specific drivers 550A–550N may correspond to HCA device-specific drivers (for all type of brand X devices and all type of brand Y devices) for providing an abstract interface to all of the initialization, configuration and control interfaces of one or more HCAs. Multiple HCA device-specific drivers may be present when there are HCAs of different brands of devices in a host system 130.

More specifically, the fabric bus driver 540 or the HCA Abstraction Layer (HCAAL) may provide all necessary services to the host-fabric adapter software stack (driver module), including, for example, to configure and initialize the resources common to all HCAs within a host system, to coordinate configuration and initialization of HCAs with the HCA device-specific drivers, to control access to the resources common to all HCAs, to control access the resources provided by each HCA, and to distribute event notifications from the HCAs to the HCA Services Layer (HSL) of the Channel Access Layer (CAL). In addition, the fabric bus driver 540 or the HCA Abstraction Layer (HCAAL) may also export client management functions, resource query functions, resource allocation functions, and resource configuration and control functions to the HCA Service Layer (HSL), and event and error notification functions to the HCA device-specific drivers. Resource query functions include, for example, query for the attributes of resources common to all HCAs and individual HCA, the status of a port, and the configuration of a port, a work queue pair (WQP), and a completion queue (CQ). Resource allocation functions include, for example, reserve and release of the control interface of a HCA and ports, protection tags, work queue pairs (WQPs), completion queues (CQs). Resource configuration and control functions include, for example, configure a port, perform a HCA control operation and a port control operation, configure a work queue pair (WQP), perform an operation on the Send or Receive Queue of a work queue pair (WQP), configure a completion queue (CQ), and perform an operation on a completion queue (CQ).

The host system 130 may communicate with one or more remote systems 150, 170 and 190, including I/O units and I/O controllers (and attached I/O devices) which are directly attached to the switched fabric 100' (i.e., the fabric-attached I/O controllers) using a Virtual Interface (VI) architecture in compliance with the *"Virtual Interface (VI) Architecture Specification, Version 1.0,"* as set forth by Compaq Corp., Intel Corp., and Microsoft Corp., on Dec. 16, 1997. VI architecture comprises four basic components: Virtual Interface (VI) in which work requests are posted to describe data movement operation and location of data to be moved for processing and/or transportation via a switched fabric 100', VI consumer which may be an application program, VI provider which may be hardware and software components responsible for instantiating VI, and completion queue (CQ). VI is the mechanism that allows VI consumer to directly access VI provider. Each VI represents a communication endpoint, and endpoint pairs may be logically connected to support bi-directional, point-to-point data transfers over one or more designated channels of a data network. Under the VI architecture, the host-fabric adapter 120 and VI Kernel agent may constitute the VI provider to perform endpoint virtualization directly and subsume the tasks of multiplexing, de-multiplexing, and data transfer scheduling normally performed by the host operating system (OS) kernel 510 and device specific driver 4550A–550N as shown in FIG. 5. However, other architectures may also be used to implement the present invention. The term "VI" as set forth in the *"Virtual Interface (VI) Architecture Specification"* may also be known as work queue pair (WQP) as set forth in the *"Next Generation Input/Output (NGIO) Specification"* or simply as queue pair (QP) as set forth in the *"InfiniBand™ Architecture Specification."* Therefore, "VI", "WQP" and "QP" are interchangeable herein below.

Figure 6:
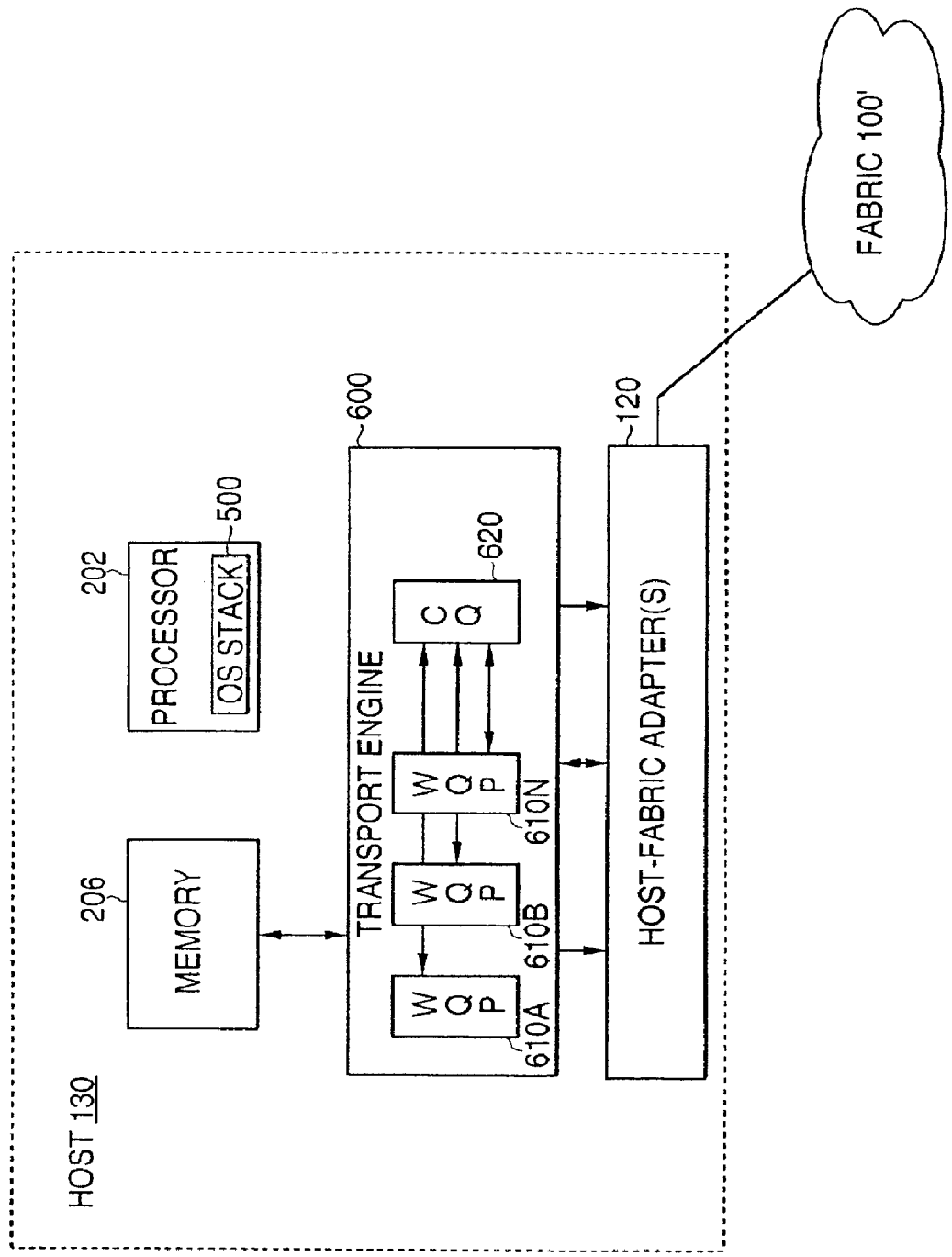
FIG. 6 illustrates a block diagram of an example host system using NGIO/InfiniBand™ and VI architectures to support data transfers via a switched fabric according to an embodiment of the present invention.

FIG. 6 illustrates an example host system using NGIO/InfiniBand™ and VI architectures to support data transfers via a switched fabric 100'. As shown in FIG. 6, the host system 130 may include, in addition to one or more processors 202 containing an operating system (OS) stack 500, a host memory 206, and at least one host-fabric adapter (HCA) 120 as shown in FIGS. 2, 4A–4B and 5, a transport engine 600 provided in the host-fabric adapter (HCA) 120 in accordance with NGIO/InfiniBand™ and VI architectures for data transfers via a switched fabric 100'. One or more host-fabric adapters (HCAs) 120 may be advantageously utilized to expand the number of ports available for redundancy and multiple switched fabrics.

As shown in FIG. 6, the transport engine 600 may contain a plurality of work queues (WQ) formed in pairs including Receive Queue ("RQ" for inbound requests) and Send Queue ("SQ" for outbound requests), such as work queue pairs (WQP) 610A–610N in which work requests "WQEs" may be posted to describe data movement operation and location of data to be moved for processing and/or transportation via a switched fabric 100', and completion queues (CQ) 620 may be used for the notification of work request completions. Alternatively, such a transport engine 600 may be hardware memory components of a host memory 206 which resides separately from the host-fabric adapter (HCA) 120 so as to process completions from multiple host-fabric adapters (HCAs) 120, or may be provided as part of kernel-level device drivers of a host operating system (OS). All work queues (WQs) may share physical ports into a switched fabric 100' via one or more host-fabric adapters (HCAs) 120.

The Send Queue ("SQ" for outbound requests) of the work queue pair (WQP) may be used to as an "initiator" which requests, for example, normal message sends to remote VIs, remote direct memory access "RDMA" reads which request messages to be read from specific memory locations of a target system, via a switched fabric 100', and remote direct memory access "RDMA" writes which request messages to be written onto specific memory locations of a target system, via a switched fabric 100'.

The Receive Queue ("RQ" for inbound requests) of the work queue pair (WQP) may be used as a "responder" which receives requests for messages from normal sends, RDMA reads and RDMA writes from a target system, via a switched fabric 100'.

In such an example data network, NGIO/InfiniBand™ and VI hardware and host software may be used to support data transfers between two memory regions, often on different systems, via a switched fabric 100'. Each host system may serve as a source (initiator) system which initiates a message data transfer (message send operation) or a target system of a message passing operation (message receive operation). Examples of such a host system include host servers providing a variety of applications or services and I/O units providing storage oriented and network oriented IO services. Requests for work (data movement operations such as message send/receive operations and RDMA read/write operations) may be posted to work queue pairs (WQPs) 610A–610N associated with a given fabric adapter (HCA), one or more channels may be created and effectively managed so that requested operations can be performed.

Figure 7:
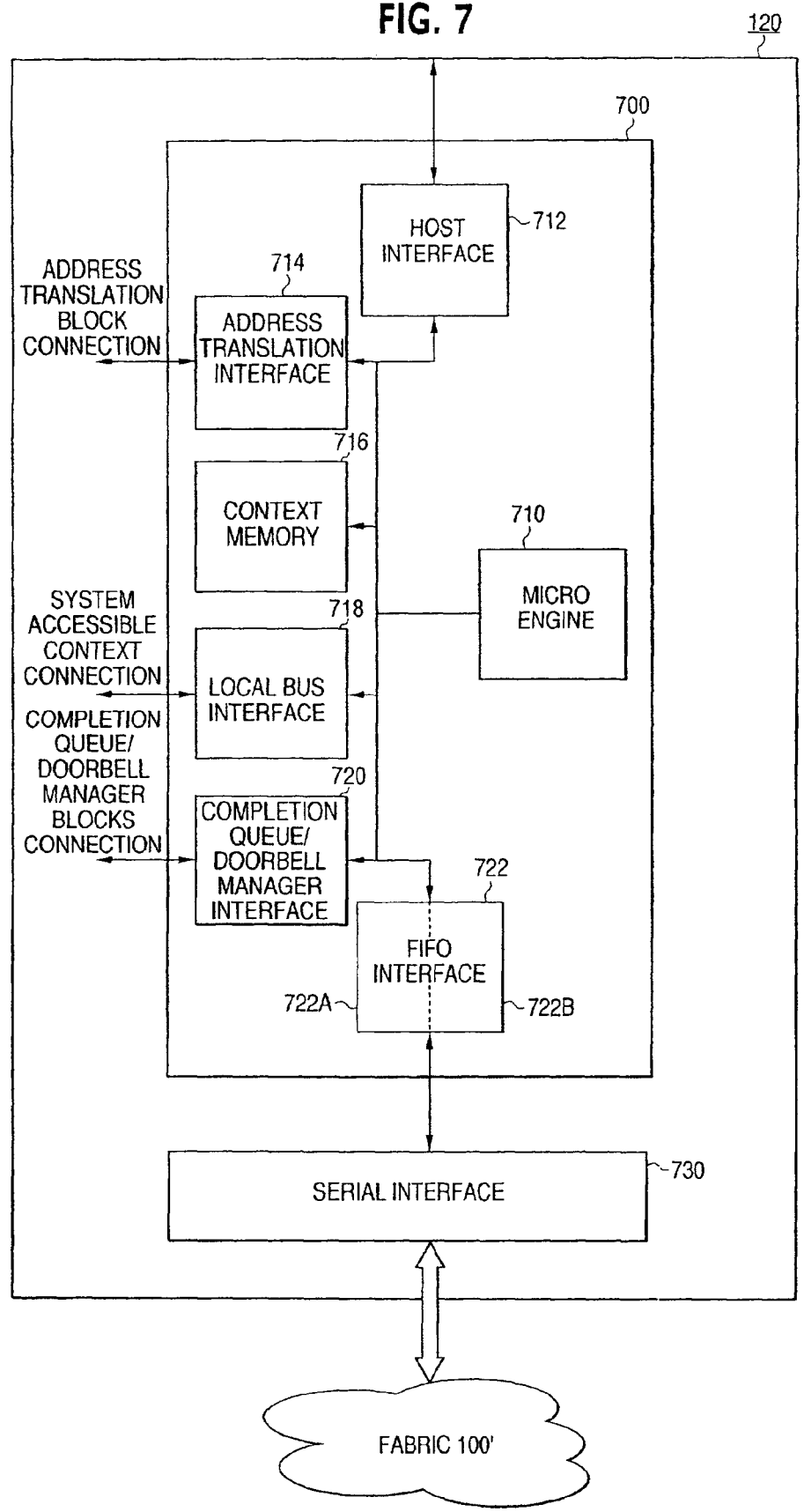
FIG. 7 illustrates an example host-fabric adapter configured in accordance with NGIO/InfiniBand™ and VI architectures to support data transfers via a switched fabric 100' according to an embodiment of the present invention.

Turning now to FIG. 7, an example host-fabric adapter 120 installed at a host system and configured in accordance with NGIO/InfiniBand™ architectures to support data transfers via a switched fabric 100' according to an embodiment of the present invention is illustrated. The example host-fabric adapter 120 is especially designed to connect a host system to a channel-based switched fabric 100' of a data network 100 for services to efficiently establish and manage NGIO/InfiniBand™ channels and support data movement operations between communication devices at a host system or between host systems connected together directly or via the data network 100' using a channel-based, switched fabric architecture. In addition, the host-fabric adapter 120 implements hardware designed for increased performance and efficiency, and optimized for, but not limited thereto, NGIO/InfiniBand™ applications with minimal hardware investment and NGIO/InfiniBand™ data processing with minimal latency.

As shown in FIG. 7, the host-fabric adapter 120 may include a micro-controller subsystem 700 which controls the execution of the NGIO/InfiniBand™ protocols, and a serial interface 730 which provides an interface with the switched fabric 100', typically via hardware SERDES (serializer/deserializer device). Both the micro-controller subsystem 700 and the serial interface 730 may be implemented as Application Specific Integrated Circuits (ASICs) of the host-fabric adapter 120.

The micro-controller subsystem 700 contains one or more independent programmable direct-memory-access (DMA) engine(s) known as Micro-Engine (ME) 710 utilized to build, send, receive and acknowledge NGIO/InfiniBand™ packets between the host memory 206 (see FIG. 6) and a serial link, and special purpose hardware interface logic blocks such as a host interface 712, an address translation interface 714, a context memory interface 716, a local bus interface 718, a completion queue/doorbell manager interface 720, and a first-in/first-out (FIFO) interface 722 controlled by the Micro-Engine (ME) 710 to perform many ME functions needed to implement the NGIO/InfiniBand™ and VI specifications, including, for example, host transactions, context updates, physical address translations, host descriptor fetches, doorbell management, FIFO data movements and completion queue (CQ) management.

The Micro-Engine (ME) 710 may execute MicroCode to coordinate Send Queue (SQ) and Receive Queue (RQ) operations for transmitting and receiving NGIO/InfiniBand™ packets and to support completion queues (CQ) and channels in compliance with the NGIO/InfiniBand™ protocols. The Micro-Engine (ME) 710 may also control all the interface blocks through a set of micro register reads and writes. Micro registers may be available with data supplied by multiple interface blocks to help speed up ME functions.

The host interface 712 provides an interface to either an I/O bus 205 of a host system 130 as shown in FIG. 4A, or an I/O and memory controller 204 of a host system 130 as shown in FIG. 4B for work requests, in the form of Work Queue Elements "WQEs" as shown in FIG. 3B–3C from the host system 130 for data transactions, including controlling arbitration and data/control multiplexing between different requesters, read and write transactions to the host system 130 and facilitating read completions.

The address translation interface 714 provides an interface to an address translation block (ATB) (not shown) responsible for managing the conversion of virtual address (used to address program space) to physical addresses (used to address system space) using a system memory Translation and Protection Table (TPT), and validating access to system memory for different transaction types (Write, RDMA Read and RDMA Write). In one example implementation, the host memory 206 may contain up to $2^{27}$ (128 million) 4 KByte pages wherein each system memory page can be mapped anywhere within up to 16 Tera Bytes of system memory address space. Each system memory page may also be accessed by an entry within the Translation and Protection Table (TPT) which contains information such as, for example, a 4 KByte page number corresponding to the physical address, memory protection attributes (RDMA Write Enable, RDMA Read Enable, Local Memory Write Enable) and Protection Domain (PD) whose value is matched with the value assigned to the initiator of the translation request (the WQP requesting the translation).

The context memory interface (CMI) 716 provides an interface to a context manager (not shown) responsible for providing necessary context information for a "VI", also known as a work queue pair "WQP" or "QP" used for sending and receiving NGIO/InfiniBand™ packets. The context information contains all the control, status and information necessary for all types of data transfer operations. The context memory interface 716 also provides an interface to host software and presents different types of memory mapped register sets which specify channel configurations and to initiate channel operations. For example, the memory mapped register sets may include global HCA context registers which affect the operation of Send Queue (SQ) and Work Queue (WQ), work queue pair (WQP) registers which control the establishment of channels, and completion queue (CQ) registers which specify the location and length of a completion queue (CQ) in host memory 206 and control whether interrupts are generated when completion queue (CQ) entries are written.

The local bus interface 718 provides an interface to a local bus responsible for supporting system accessible context connections and channel operations, and turning the signal data into appropriate forms for the Micro-Engine (ME) 710. Typically, the local bus interface 718 contains a local bus controller (DLB) (not shown) for handling reads and writes on the local bus that access local bus registers from the Micro-Engine (ME) 710. Such a local bus controller (DLB) may also be responsible for MicroCode loading.

The completion queue/doorbell manager interface 720 provides an interface to completion queue (CQ) engine, and doorbell manager and memory registration rules of the VI architecture. Completion queue (CQ) engine (not shown) is responsible for posting global events and completion queue (CQ) entries. Doorbell manager (not shown) is responsible for keeping track of the number of outstanding work requests.

The FIFO interface 722 provides an interface to the serial interface 730. The FIFO interface 722 may include a Receive FIFO interface 722A arranged to receive request(s) and/or data packet(s) from the switched fabric 100' via a Receive FIFO and a serial interface 730, and a Transmit FIFO interface 722B arranged to send request(s) and/or data packet(s) to the switched fabric 100' via a Transmit FIFO and a serial interface 730.

The Receive FIFO interface 722A may be used by the Micro-Engine (ME) 710 to process incoming data packets, via the serial interface 730, including checking the header of each packet as shown in FIG. 3A for errors and checking if additional data needs to be read before passing the same to the host interface 712. The Transmit FIFO interface 722B may be used by the Micro-Engine (ME) 710 to build data packets for subsequent transmission, via the serial interface 730.

In addition, a Scheduler (not shown) may also be included for scheduling the next Virtual Interface (VI) to the context manager and supporting priority of traffic for data packets associated with Send Queue (SQ) and Receive Queue (RQ) of the work queue pair (WQP). Such a Scheduler may be provided to interface with the context memory interface 716, the local bus interface 718 and the completion queue/doorbell manager interface 720 for scheduled functions.

Figure 8:
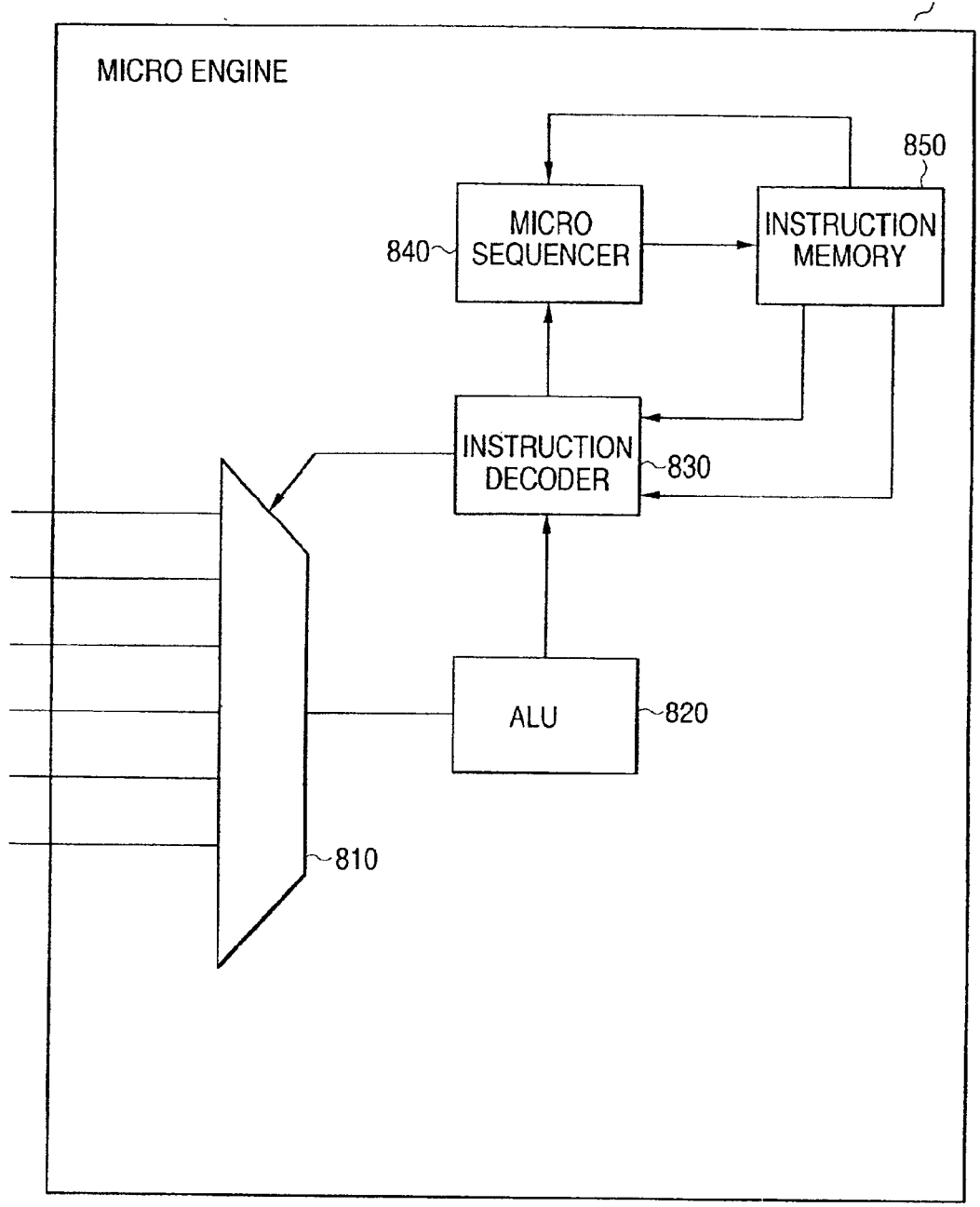
FIG. 8 illustrates an example Micro-Engine (ME) of a host-fabric adapter according to an embodiment of the present invention.

FIG. 8 illustrates an example Micro-Engine (ME) 710 configured to handle one of Send Queue and Receive Queue operations, including multiple independent operations (known as tasks) for performance efficiency with minimum hardware investment according to an embodiment of the present invention. As shown in FIG. 8, the Micro-Engine (ME) 710 may comprise one or more Data Multiplexers (MUXs) 810, an Arithmetic Logic Unit (ALU) 820, an Instruction Decoder 830, a Micro-Sequencer 840, and an Instruction Memory 850. The Instruction Memory 850 may store downloadable MicroCode for ME instructions. The data MUXs 810 may supply appropriate interface data based on ME instructions. The Arithmetic Logic Unit (ALU) 820 may perform any mathematical, logical and shifting operations. The Instruction Decoder 830 may supply system controls to the Micro-Sequencer 840 to determine the next instruction or address to be executed, execute ME instructions from the Instruction Memory 850, and determine the functions of the ALU 820. The Micro-Sequencer 840 may check the sequence of ME instructions and determine which next instruction is to be executed by the Instruction Decoder 820.

During any clock cycle, multiple tasks may be performed by the Micro-Engine (ME) 710 in order to increase performance efficiency with minimum hardware investment. These multiple tasks include, but are not limited to, physical address translations, host descriptor fetches, doorbell management, FIFO data movement and completion queue management.

Figure 9:
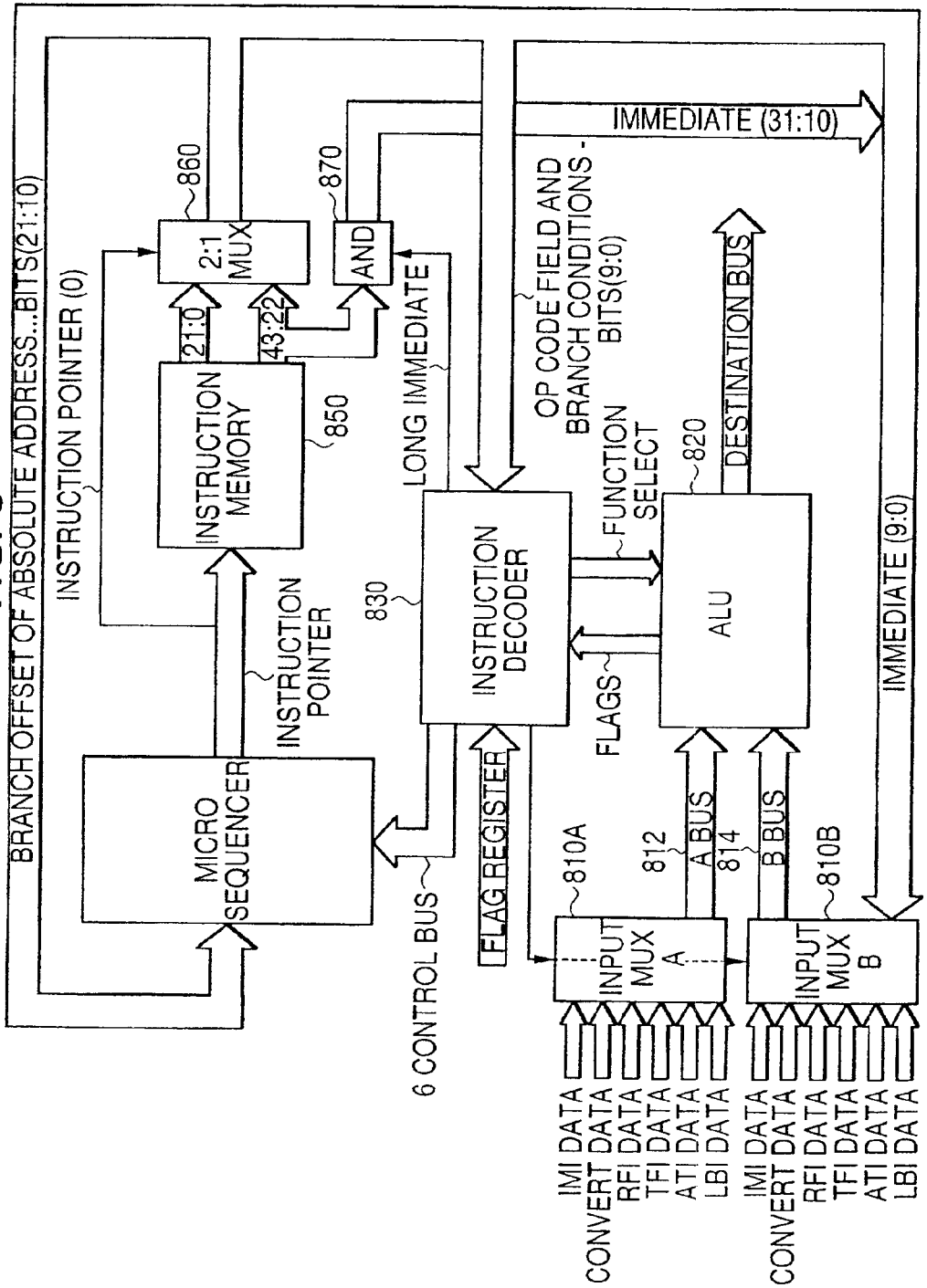
FIG. 9 illustrates an example implementation of a Micro-Engine (ME) of a host-fabric adapter according to an embodiment of the present invention.

One example implementation of the data MUXs 810, the Arithmetic Logic Unit (ALU) 820, the Instruction Decoder 830, the Micro-Sequencer 840, and the Instruction Memory 850 of an example Micro-Engine (ME) 710 may be described with reference to FIG. 9 herein below:

Flag Register: The Flag Register is an accumulation of status bits supplied by interface blocks. These bits (called jump bits) are supplied to the Micro-Engine (ME) 710 to reduce the amount of instructions needed in making decisions. Examples of these jump bits include Completion Queue (CQ) busy bits, data busy bits, and jump bits based on the outcome of a compare instruction and ALU results. The Micro-Engine (ME) 710 uses the Flag Register by executing a jump instruction based on the value of a specific bit. A complete table of jump bits may be found in TABLE #1 shown herein below.

| Bit Number | Ucode Name | On behalf of | Description |
| --- | --- | --- | --- |
| 00 | A | | Always Jump |
| 01 | Z | ALU | Zero Flag - Z |
| 02 | C | ALU | Carry Flag - C |
| 03 | GT | ALU | Greater Than Flag - GT |
| 04 | LT | ALU | Less Than Flag - LT |
| 05 | E | ALU | Equal Flag - E |
| 06 | C12 | ALU | 12-bit Carry Flag - C |
| 07 | rf_hdr_good | RFI | RX Header Good |
| 08 | rf_last_or_only | RFI | Received packet is a last or only packet |
| 09 | rf_first_or_only | RFI | Received packet is a first or only packet |
| 10 | rf_read_request | RQ-RFI | RQ: Received packet is a Read Request packet |
| | rf_read_response | SQ-RFI | SQ: Received packet is a Read Response packet |
| 11 | rf_write_packet | RQ-RFI | RQ: Received packet is a Write packet |
| 12 | rf_send_packet | RQ-RFI | RQ: Received packet is a Send packet |
| 13 | rf_imm_data | RQ-RFI | RQ: Received packet has Immediate Data |
| 14 | rf_rx_grh_present | RQ-RFI | RQ: Received packet has a GRH |
| 15 | lrh_tx_grh | LBI | LRH indicates that the TX packet contains a GRH |
| 16 | at_busy | ATI | Address Translation Interface is busy |
| 17 | at_error | ATI | Address Translation Block (ATB) has responded with error status. |
| 18 | cq_busy | CQI | Completion Queue Interface is busy |
| 19 | im_hdr_busy | IM | Inbound MUX Command (Header) cycle busy |
| 20 | im_task_hdr_busy | IM | Inbound MUX Command (Header) cycle busy due to a request from the current task. |
| 21 | im_wqe_wr_busy | IM | Inbound MUX Descriptor Write Data Cycle busy |
| 22 | im_wqe_rd_busy | IM | Inbound MUX Descriptor Read Data Cycle busy |
| 23 | im_fifo_busy | IM | Inbound MUX FIFO Data Cycle busy |
| 24 | db_count_zero | DBM | Door Bell Count for current VI equal to Zero |
| 25 | tf_fifo_busy | TFI | Transmit FIFO busy |
| 26 | db_busy | DBM | Doorbell Manager interface is busy |
| 27 | rmb_busy | RMB | Rkeys Manager Block is busy processing the Memory |
| 28 | lb_unreliable | LBI | DLB Unreliable mode |
| 29 | lb_datagram | LBI | DLB Datagram |
| 30 | rf_solicit_event | RQ-RFI | Receive Packet Solicited Event bit |

-continued

| Bit Number | Ucode Name | On behalf of | Description |
|---|---|---|---|
| 31 | rf_msn_invalid | SQ-RFI | SQ: Incoming AETH has an invalid MSN |
|  | rf_ack_request | RQ-RFI | RQ: Incoming request has the ACK Request bit set. |

Instruction (OpCode) Decoder 830: The function of the OpCode Decoder 830 is to control the Micro Sequence, ALU function and the source/destination selection. The Branch Conditions and OpCode field of the MicroCode instruction is decoded and control is supplied to Micro-Engine (ME) 710 and interface blocks such as the host interface 712, the address translation interface 714, the VI context memory interface 716, the local bus interface 718, the completion queue/doorbell manager interface 720, and the first-in/first-out (FIFO) interface 722 needed to control ME functions. The MicroCode instructions may be listed in TABLE #2 and TABLE #3 shown herein below.

TABLE 2

MicroCode ALU Instructions

| Instruction | Destination | Source | Flags Set | Explanation |
|---|---|---|---|---|
| ADD | A | B | Z, C | Register A gets sum of Registers A and B |
| ADDI | A | IMM | Z, C | Register A gets sum of Register A and 10 bit Immediate Data |
| ADDL | A | IMM | Z, C | Register A gets sum of Register A and 32 bit Immediate Data |
| SUB | A | B | Z, C | Register A gets difference of Registers A and B |
| SUBI | A | IMM | Z, C | Register A gets difference of Register A and 10 bit Immediate Data |
| SUBL | A | IMM | Z, C | Register A gets difference of Register A and 32 bit Immediate Data |
| OR | A | B | Z | Register A gets logical OR of Registers A and B |
| ORI | A | IMM | Z | Register A gets logical OR of Register A and 10 bit Immediate Data |
| ORL | A | IMM | Z | Register A gets logical OR of Register A and 32 bit Immediate Data |
| XOR | A | B | Z | Register A gets logical XOR of Registers A and B |
| XORI | A | IMM | Z | Register A gets logical XOR of Register A and 10 bit Immediate Data |
| XORL | A | IMM | Z | Register A gets logical XOR of Register A and 32 bit Immediate Data |
| AND | A | B | Z | Register A gets logical AND of Registers A and B |
| ANDI | A | IMM | Z | Register A gets logical AND of Register A and 10 bit Immediate Data |
| ANDL | A | IMM | Z | Register A gets logical AND of Register A and 32 bit Immediate Data |
| CMP | A | B | GT, E | Flags get set based on comparison of Registers A and B |
| CMPI | A | IMM | GT, E | Flags get set based on comparison of Register A and 10 bit Immediate Data |

TABLE 2-continued

MicroCode ALU Instructions

| | | | | |
|---|---|---|---|---|
| CMPL | A | IMM | GT, E | Flags get set based on comparison of Register A and 32 bit Immediate Data |
| ROR | A | A | Z | Rotate Register A right one bit. MSB ← LSB |
| RORC | A | A | Z, C | Rotate Register A right one bit through carry. C ← LSB, MSB ← C |
| SHL | A | A | Z | Shift Register A left one bit. LSB ← '0' |
| MOV | A | B |  | Register A gets contents of Register B |
| MOVI | A | IMM |  | Register A gets contents of 10 bit Immediate Data. |
| MOVL | A | IMM |  | Register A gets contents of 32 bit Immediate Data. |

| Instruction | Condition | Source | Flags Set | Explanation |
|---|---|---|---|---|
| BITT | Bit Number | A | Z | Flags get set based on a test of the bit number in Register A |

TABLE 3

MicroCode Sequence Control Instructions

| Instruction | Condition | Address | Explanation |
|---|---|---|---|
| JMPS | Bit Number | Absolute | Jump to Absolute Address if selected Flag Bit Number bit is set. |
| JMPC | Bit Number | Absolute | Jump to Absolute Address if selected Flag Bit Number bit is clear. |
| CALL | Bit Number | Absolute | Call to Absolute Address if selected Flag Bit Number bit is set |
| CJMP | N/A | N/A | Jump to Instruction Pointer plus Case Register |
| RET | N/A | N/A | Return to Instruction Pointer one greater than last CALL |

There are two types of instructions decoded by the OpCode Decoder 830, the ALU 820 and the Micro-Sequencer 840. MicroCode ALU instructions require control of the Input MUX 810A–810B (to select A-bus and B-bus data for the ALU 820), function select (to control instruction execution through the ALU) and Micro Sequence (to point to the next instruction). MicroCode ALU instructions can be found in TABLE #2. MicroCode Sequence instructions control the Micro Sequencer 840 (to branch from the current instruction stream) and do not utilize the ALU 820. Micro-Code Sequence instructions can be found in TABLE #3.

Data MUX 810: There may be two input data MUXs, input MUX-A 810A and input MUX-B 810B which supply two 32-bit buses (A-bus and B-bus) inputs to the ALU 820. The A-bus 812 may supply data based on decode of the destination field of the ME instruction to the ALU 820. Likewise, the B-bus 814 may supply data based on decode of the source field of the ME instruction to the ALU 820. The data inputs to the input data MUXs 810A and 810B may be supplied by external interface blocks such as the host interface 712, the address translation interface 714, the VI context memory interface 716, the local bus interface 718, the completion queue/doorbell manager interface 720, and the first-in/first-out (FIFO) interface 722 needed to control ME functions. The input MUX-B 810B may include Immediate Data from the ME instruction, via 2:1 Multiplexer (MUX) 860 and logic AND gate 870. The decode of the destination/source field, which generate the selects for the input MUX-A 810A and MUX-B 810B, may be executed by the Instruction Decoder 830.

Arithmetic Logic Unit (ALU) 820: The ALU 820 may contain two (A and B) 32-bit data inputs and perform functions that are based on the OpCode field of the ME instruction. The functions supported include, but are not limited to, Add, Subtract, OR, XOR, AND, Compare, Rotate Right, Shift Left, Bit test and Move (pass through). The Instruction Decoder 830 may decode the ME instruction and provide the function select signals to the ALU 820. After executing the selected function, the ALU 820 sets flags based on the outcome. The flags may include, for example, Zero and Carry. If the result of an arithmetic function is zero, the Z flag may be set. In contrast, if the arithmetic function results in a carry out, the C flag may be set. Results of ALU functions may affect the state of the Z flag. An explanation of the MicroCode ALU functions and the resultant flag bits affected may be found in TABLE #2.

Instruction Memory 850: The Instruction Memory 850 may be a random-access-memory RAM provided to store MicroCode for providing ME instructions via 2:1 Multiplexer (MUX) 860 and logic AND gate 870. MicroCode may be downloadable into the RAM for changes in future NGIO/InfiniBand™ specification enhancements. The RAM may contain 1K×47 bits and may be loaded via the local bus. Each ME instruction may be 23 bits, for example, and two instructions may be allowed for each word of RAM. The MicroCode supplied by the RAM may be available in different code formats.

The Destination and Source fields address up to 256 registers in the interface blocks such as the host interface 712, the address translation interface 714, the VI context memory interface 716, the local bus interface 718, the completion queue/doorbell manager interface 720, and the first-in/first-out (FIFO) interface 722. All registers may be loaded and read in 32 bit quantities. There is no other resolution such as byte resolution supported by the interface blocks and the Micro-Engine (ME) 710.

When the ME instruction contains a destination and source, which are supplied by registers, the format of the instruction may be in a 23-bit field. This allows two instructions to reside in one 46-bit RAM Micro Code location and the MSB (most significant bit) is used for Micro Code data parity. The LSB (least significant bit) of the Micro Sequencer instruction pointer will control the select of a MUX that supplies Micro Code contents to the OpCode Decoder 830. The MUX 810A or 810B may be used to select the high or low 23 bits of the Micro Code. A breakdown of this format can be found in TABLE #4 below.

| 5 Bits | 8 Bits | 8 Bits | 2 Bits |
|---|---|---|---|
| OpCode | Destination | Source | Reserved |

When the ME instruction contains a destination that is supplied by a register and a source supplied by 10 bits of immediate data, the format of the instruction may be in a 23-bit field. This format also allows two instructions to reside in one MicroCode location in the Instruction Memory 850. A breakdown of this format can be found in TABLE #5 below.

| 5 Bits | 8 Bits | 10 Bits |
|---|---|---|
| OpCode | Destination | Immediate |

When the ME instruction contains a destination that is supplied by a register and a source supplied by 32 bits of immediate data, the format of the instruction may be in a 46-bit field. 46 bit instructions must start on an even address. Requiring a 46-bit field causes the Micro Sequencer 840 to increment by two. A breakdown of this format can be found in TABLE #6 herein below.

| 22 Bits | 1 Bit | 5 Bits | 8 Bits | 10 Bits |
|---|---|---|---|---|
| Immediate [31:10] | Reserved | OpCode | Destination | Immediate [9:0] |

When the instruction is a BITT (bit test) the format contains the bit number that is to be tested and the register the bit is located in. This is used to check bit assertions in context registers. For example, when the MicroCode wants to access host memory 206, the Physical Address Valid bit must be tested to determine if an address translation is needed. With one instruction (BITT) the validity of Context Physical address can be tested and a following JMP instruction will point to an address translation routine (if Z flag=0) or a host memory routine (if Z=1). The format of the instruction is in a 23-bit field which allows two instructions to reside in one 46-bit RAM Micro Code location. A breakdown of this format can be found in TABLE #7 below.

| 5 Bits | 5 Bits | 3 Bits | 8 Bits | 2 Bits |
|---|---|---|---|---|
| OpCode | Test Bit Number | Reserved | Source | Reserved |

When the instruction is a Micro Engine Sequence control instruction (JMP, CALL, CJMP) the format contains the Flag register bit number checked and the absolute address of the next instruction. The instruction contained in the next contiguous address will be executed if the flag register bit is not set. If the flag register bit is set, the Instruction Pointer will be adjusted based on the absolute address field of the MicroCode. This format is contained in a 23-bit field which allows two instructions to reside in one 46-bit RAM Micro Code location. A breakdown of this format can be found in TABLE #8.

| 5 Bits | 5 Bits | 1 Bits | 12 Bits |
|---|---|---|---|
| OpCode | Flag Reg Bit Number | Reserved | Absolute Address |

Micro-Sequencer 840: The function of the Micro-Sequencer 840 is to supply addressing to the MicroCode RAM 850. Based on decodes of the MicroCode and Flag register information, the address sequence of the MicroCode is computed. The Instruction (OpCode) Decoder 830 then controls the next address sequence and control information is passed to the Micro Sequencer 840. Control from the Instruction Decoder 830 may be used to determine what source is used to supply addressing to the RAM 850. Sources include Absolute Address from sequence control instructions (JMPS, JMPC, CALL), addresses popped from the Stack (RET), next sequential code address (ALU instructions) and case (CJMP) addresses. The push/pop stack may also be located in the Micro-Sequencer 840.

Major challenges implementing a host-fabric adapter as shown in FIG. 7 are to maximize performance and resources of the Micro-Engine (ME) 710 in processing NGIO/ InfiniBand™ packets and to optimize memory bandwidth while preserving the overall transfer rate. Specialized Hardware Assist (HWA) logic may be incorporated into one or more special purpose hardware interface blocks, such as the host interface 712, the address translation interface 714, the VI context memory interface 716, the local bus interface 718, the completion queue/doorbell manager interface 720, and the FIFO interface 722 so as to assist their respective interface functions and to help offloading the Micro-Engine (ME) 710 from hardware calculations in processing NGIO/ InfiniBand™ packets. Context information which is stored in an internal context memory of the context memory interface 716 for sending and receiving NGIO/InfiniBand™ packets may need to be updated during ME cycles in such a way as to optimize memory bandwidth and preserve the overall data transfer rate. Typically such context information may be updated to provide all the control, status and information necessary for all types of data transfers. The context memory is always updated with latest values of context information, and the Micro-Engine (ME) 710 accesses to the latest values of that context information to do work (data movement operations such as message send/ receive operations and RDMA read/write operations).

More importantly, the Micro-Engine (ME) 710 may be implemented to operate in a pipelined fashion and have a throughput of one instruction per clock to keep up with the bandwidth requirements of the host interface side and the serial interface side. The MicroCode (ME instruction) may be deterministic (for e.g. simple logic and arithmetic instructions such as ADD, Subtract, OR, XOR, AND, Compare and Move), non-deterministic (for e.g. conditional Jump instructions) or multi-tasking. Specifically, the Micro-Engine (ME) 710 may be implemented with a pipelined instruction execution architecture to optimize processing data messages for higher throughput. The instruction processed by the Micro-Engine (ME) 710 can be deterministic as described with reference to FIGS. 10–11, or non-deterministic as described with reference to FIGS. 12–13, or multi-tasking (multiple threads) as described with reference to FIG. 14 herein below.

Figure 10:
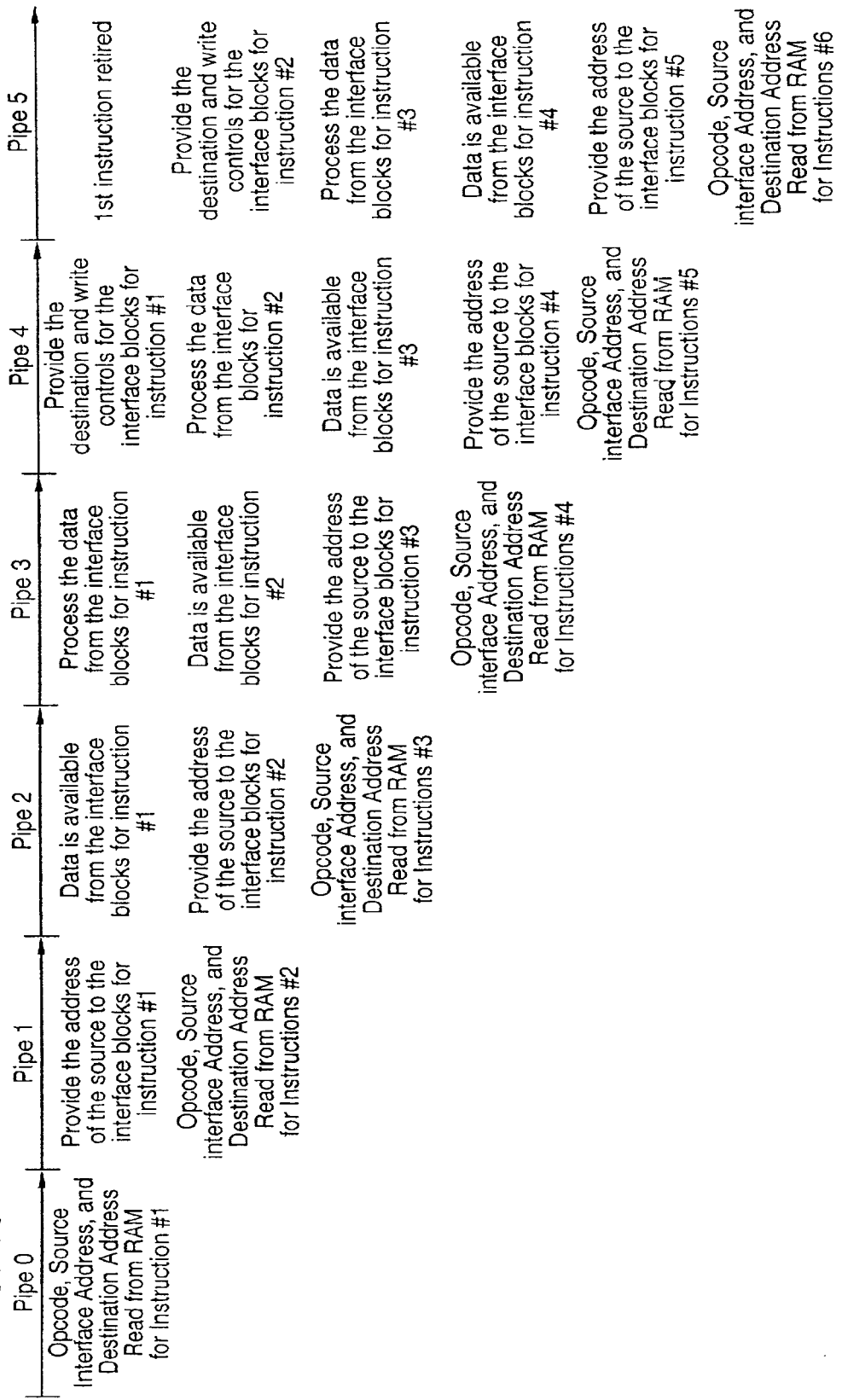
FIG. 10 illustrates an example high level pipelined instruction execution sequence of a Micro-Engine (ME) of a host-fabric adapter according to an embodiment of the present invention.

For example, FIG. 10 illustrates an example high level pipelined instruction execution architecture of a Micro-Engine (ME) 710 of the micro-controller subsystem 700 implemented to process data messages with high throughput and running at maximum possible clock speed for a given technology. The example shown is valid when the Micro-Code (ME instruction) is deterministic (i.e., simple logic and arithmetic instructions such as ADD, Subtract, OR, XOR, AND, Compare and Move). The Micro-Engine (ME) 710 needs to have a throughput of one instruction per clock to keep up with the bandwidth requirements of the host interface side and the serial interface side. However, the reads and writes of the surrounding interface blocks such as the host interface 712, the address translation interface 714, the VI context memory interface 716, the local bus interface 718, the completion queue/doorbell manager interface 720, and the FIFO interface 722, takes more than one clock due to limitations of implementation speed (process technology limitations) in the host-fabric adapter design. As a result, the Micro-Engine (ME) 710 needs to compensate the multi-clock reads and writes of the surrounding slower interface blocks in order to actually achieve a throughput of one instruction per clock.

The Micro-Engine (ME) 710 operates in a pipelined fashion as shown in FIG. 10. The pipelined instruction execution sequence (Pipe #0, Pipe #1, Pipe #2, Pipe #3, Pipe #4, Pipe #5, Pipe #6 etc..) represents different clock cycles. As shown, the OpCode, Source and Destination Address are read from the Instruction Memory 850 at Pipe #0. The data corresponding to the Source for Instruction #1 is not available from the interface block sourcing the data till Pipe #2. Once the Micro-Engine (ME) 710 gets the data, the Micro-Engine (ME) 710 has to perform arithmetic and logic operations on the source data, and does so at Pipe #3. The data to be written is only available to the interface block at Pipe #4. The Micro-Engine (ME) 710 needs to have a throughput of one instruction per clock to keep up with the bandwidth requirements of the host interface side and the serial interface side. Therefore, the highly pipelined instruction execution architecture of the Micro-Engine (ME) 710 is intended to hide the read and write cycle latencies. In addition, circuitry inside the Micro-Engine (ME) 710 as described with reference to FIG. 9 keeps monitoring the source and the destination bus for these conditions. The conditions may indicate that the data has NOT reached the destination yet. The condition may indicate that the data is read from the source that has since been modified. The Micro-Engine (ME) 710 ensures that only the latest data from the interface blocks is processed and that the correct data is written to the interface blocks.

Specifically, the Micro-Engine (ME) 710 ensues processing Instruction #1 at Pipe #0, that is, OpCode, Source and Destination Address are read from the Instruction Memory 850 at Pipe #0. In general, Pipe #1, Pipe #2, Pipe #3, and Pipe #4 represent a series of steps taken by the Micro-Engine (ME) 710 before the Instruction #1 is retired at Pipe #5. But the Micro-Engine (ME) 710 needs to have a throughput of one instruction per clock to keep up with the bandwidth requirements of the host interface side and the serial interface side. Therefore, the Micro-Engine (ME) 710 may be configured to process multiple instructions in parallel in order to keep up with the host and the serial side rather than having to wait for Instruction #1 to retire at Pipe #5. The direct effect of this pipelining is the increased throughput through this Micro-Engine (ME) 710.

For example, at Pipe #1, the Micro-Engine (ME) 710 provides the address of the source to the interface blocks for Instruction #1 so that data may be available for subsequent processing. At the same time, the Micro-Engine (ME) 710 ensues processing another instruction, Instruction #2 at Pipe #1, that is, OpCode, Source and Destination Address are read from the Instruction Memory 850 at Pipe #1.

At Pipe #2, the data for Instruction #1 is now available from the interface blocks. Meanwhile, the Micro-Engine (ME) 710 provides the address of the source to the interface blocks for Instruction #2 so that data may be available for subsequent processing. At the same time, the Micro-Engine (ME) 710 also ensues processing yet another instruction, Instruction #3 at Pipe #2, that is, OpCode, Source and Destination Address are read from the Instruction Memory 850 at Pipe #2.

At Pipe #3, the Micro-Engine (ME) 710 processes the data from the interface blocks for Instruction #1. Meanwhile, the data for Instruction #2 is now available from the interface blocks. The Micro-Engine (ME) 710 provides the address of the source to the interface blocks for Instruction #3 so that data may be available for subsequent processing. At the same time, the Micro-Engine (ME) 710 also ensues processing yet another instruction, Instruction #4 at Pipe #3, that is, OpCode, Source and Destination Address are read from the Instruction Memory 850 at Pipe #3.

At Pipe #4, the Micro-Engine (ME) 710 provides the destination and write controls of Instruction #1 for the interface blocks for writing the processed data. At the same time, the Micro-Engine (ME) 710 also processes the data from the interface blocks for Instruction #2. Meanwhile, the data for Instruction #3 is now available from the interface blocks. The Micro-Engine (ME) 710 provides the address of the source to the interface blocks for Instruction #4 so that data may be available for subsequent processing. At the same time, the Micro-Engine (ME) 710 also ensues processing yet another instruction, Instruction #5 at Pipe #4, that is, OpCode, Source and Destination Address are read from the Instruction Memory 850 at Pipe #4. So by processing the multiple instructions in parallel in multiple pipelines, the Micro-Engine is able to achieve a processing throughput of one Micro-Instruction per clock.

At Pipe #5, Instruction #1 is retired. The Micro-Engine (ME) 710 provides the destination and write controls of Instruction #2 for the interface blocks for writing the processed data. At the same time, the Micro-Engine (ME) 710 also processes the data from the interface blocks for Instruction #3. Meanwhile, the data for Instruction #4 is now available from the interface blocks. The Micro-Engine (ME) 710 provides the address of the source to the interface blocks for Instruction #5 so that data may be available for subsequent processing. At the same time, the Micro-Engine (ME) 710 also ensues processing yet another instruction, Instruction #6 at Pipe #5, that is, OpCode, Source and Destination Address are read from the Instruction Memory 850 at Pipe #4. So by processing the multiple instructions in parallel in multiple pipelines, the Micro-Engine (ME) 710 is able to achieve a processing throughput of one Micro-Instruction per clock.

As described with reference to FIG. 10, the Micro-Engine (ME) 710 may handle multiple instructions at any given time. For example, the Micro-Engine (ME) 710 may handle up to three (3) instructions at Pipe #2, four (4) instructions at Pipe #3 and five (5) instructions at Pipe #4 Pipe #5. So by processing the multiple instructions in parallel in multiple pipelines, the Micro-Engine (ME) 710 is able to achieve a processing throughput of one Micro-Instruction per clock. This achieves the peak efficiency needed to keep up with the host and the serial side of the host-fabric adapter (HCA).

Figure 11:
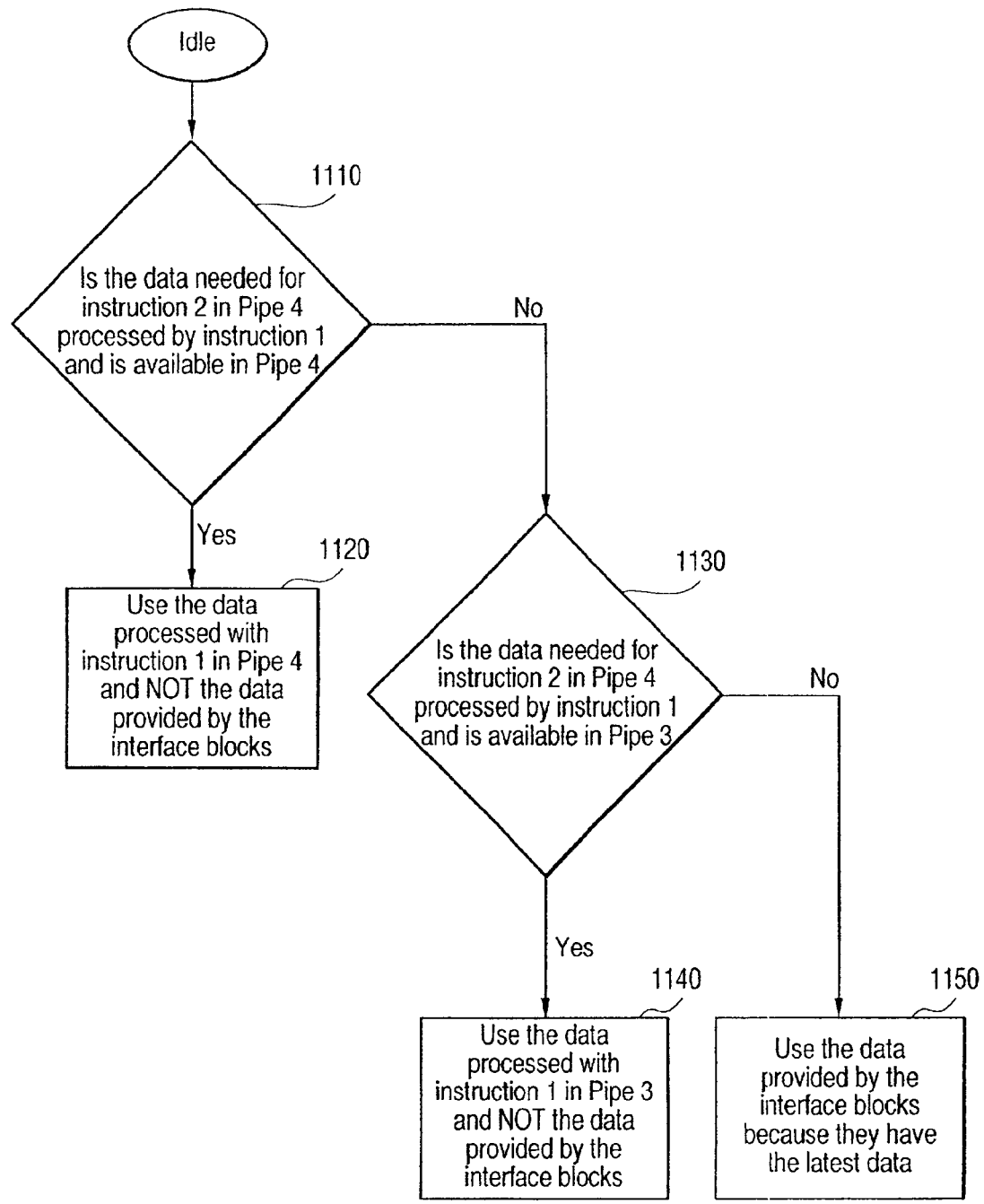
FIG. 11 illustrates an example flow chart of a pipelined instruction execution sequence as shown in FIG. 10.

FIG. 11 illustrates an example flow chart of a Micro-Engine (ME) having a pipelined instruction execution architecture that ensures that only the latest data AND not the stale data from the interface blocks is used. It thereby guarantees that the correct data is written to the interface blocks. As shown in FIG. 11, the Micro-Engine (ME) 710 determines if the data needed for Instruction #2 in Pipe #4 is the same as the data that was processed by Instruction #1 and is available in Pipe #4 at block 1110. This is done by comparing the destination address of the Instruction #1 with the source address of Instruction #2 at the appropriate pipeline. Pipe #4 is important pipeline for instruction #2 because data processing for instruction # 2 occurs in that pipeline. If the data needed for Instruction #2 in Pipe #4 is the same as the data that was processed by Instruction #1 and is available in Pipe #4, then the Micro-Engine (ME) 710 uses the data processed with Instruction #1 in Pipe #4 and NOT the data provided by the interface blocks at block 1120.

However, if the data needed for Instruction #2 in Pipe #4 is NOT the same as the data that was processed by Instruction #1 and is available in Pipe #4, then the Micro-Engine (ME) 710 determines if the data needed for Instruction #2 in Pipe #4 is the same as the data that was processed by Instruction #1 and is available in Pipe #3 at block 1130. This is done by comparing the destination address of the Instruction #1 with the source address of Instruction #2 at the appropriate pipeline. If the data needed for Instruction #2 in Pipe #4 is the same as the data that was processed by Instruction #1 and is available in Pipe #3, then the Micro-Engine (ME) 710 uses the data processed with Instruction #1 in Pipe #3 and NOT the data provided by the interface blocks at block 1140. If the above-mentioned condition is false, then the Micro-Engine (ME) 710 uses the data provided by the interface blocks because the interface blocks have the latest data at block 1150. This guarantees that the Micro-Engine (ME) 710 processes the Micro-instructions correctly even in the event of data dependency between contiguous instructions. The data dependency between contiguous instructions gets exacerbated by the fact that the Micro-Engine (ME) 710 does NOT truly complete processing one instruction in every clock. If one instruction per clock is truly processed, then there is NO data dependency issue between contiguous instructions. For example, the Micro-Engine (ME) 710 can handle up to three (3) instructions at Pipe #2, four (4) instructions at Pipe #3 and five (5) instructions at Pipe #4 and Pipe #5. So the architecture described in this application solves the data dependency issue even in the case of processing five instructions at any given time. This concept can be expanded to process any number of instructions and the number of five chosen here is for example purposes only.

Figure 12:
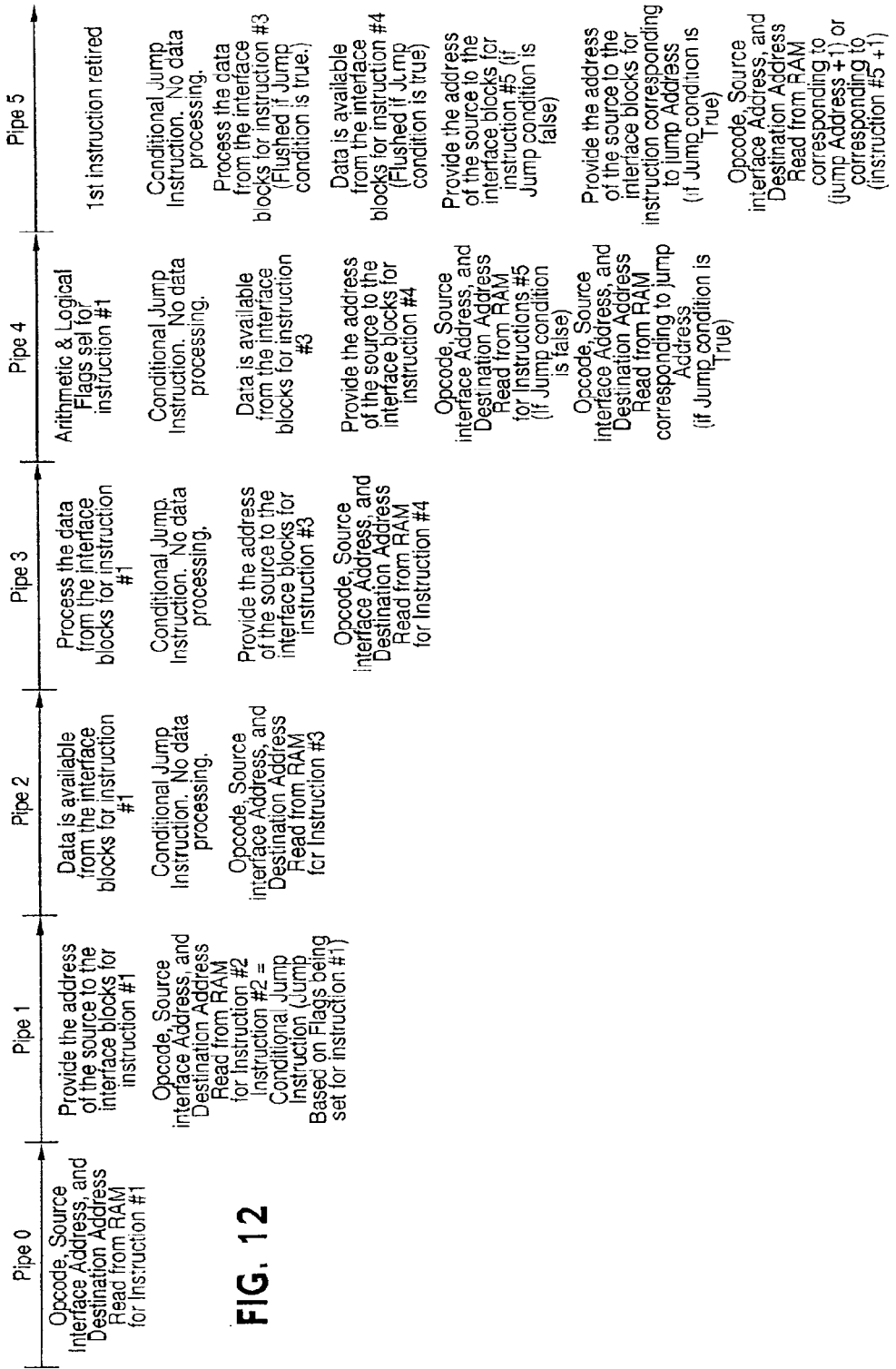
FIG. 12 illustrates an example high level pipelined instruction execution sequence of a Micro-Engine (ME) of a host-fabric adapter according to another embodiment of the present invention.

FIG. 12 illustrates an example high level pipelined instruction execution architecture of a Micro-Engine (ME) 710 of the micro-controller subsystem 700 implemented to process data messages at high speeds, when the MicroCode (ME instruction) is non-deterministic (such as conditional Jump instructions). The Micro-Engine (ME) 710 is expected to execute one instruction per cycle to operate at maximum throughput and keep up with the host and the serial interface side, even in the face of uncertainty of the next instruction to be executed (such as conditional Jump instructions).

The Micro-Engine (ME) 710 operates in a pipelined fashion as shown in FIG. 12. In general, the Micro-Engine (ME) 710 ensues processing Instruction #1 at Pipe #0, that is, OpCode, Source and Destination Address are read from the Instruction Memory 850 at Pipe #0. However, the results for Instruction #1 are not available until Pipe #4. But if Instruction # 2 is a conditional Jump instruction based on the results of Instruction #1, the execution of Instruction #3 and the following instructions has to wait until Pipe #4. But if the Micro-Engine (ME) 710 has to basically stall waiting for the results of Instruction #1 until Pipe #4, a lot of cycles are wasted and the Micro-Engine (ME) 710 throughput is less than one instruction per clock cycle. This has severe consequences on the performance of the HCA because the Micro-Engine (ME) 710 will be highly inefficient and will not be able to either keep up with data processing speed on the host side or the serial interface side. Therefore, the highly pipelined instruction execution architecture of the Micro-Engine (ME) 710 is intended to ensure the Micro-Engine (ME) 710 can execute one instruction per clock cycle even in the face of uncertainty of the next instruction to be executed.

As shown in FIG. 12, the Micro-Engine (ME) 710 starts executing Instruction #3 and Instruction #4 as if the previous instructions are non-conditional data processing instructions. In Pipe #4 (when the results for Instruction #1 are available AND the condition on which the Jump has to happen is TRUE), the Micro-Engine (ME) 710 instructs the Instruction Memory 850 to read the instruction corresponding to location of the Jump address. The Micro-Engine (ME) 710 then starts the pipeline corresponding to the Jumped address instruction starting from Pipe #5. But Instruction #3 and Instruction #4 are already in the data processing pipeline. Therefore, the Micro-Engine (ME) 710 has to be smart enough to make sure that Instruction #3 and Instruction #4 are taken out of the pipeline smoothly. If the Jump condition is FALSE (in Pipe #4), the Micro-Engine (ME) 710 keeps going with the pipeline for Instruction #3 and Instruction #4 etc. as if the previous instructions (Instruction #1 and Instruction #2) are normal data processing instructions. So there is no cycle hit on data processing if no Jump ever took place.

More specifically, the Micro-Engine (ME) 710 executes Instruction #1 at Pipe #0, that is, OpCode, Source and Destination Address are read from the Instruction Memory 850 at Pipe #0. Again, Pipe #1, Pipe #2, Pipe #3, and Pipe #4 represent a series of steps taken by the Micro-Engine (ME) 710 before the Instruction #1 is retired at Pipe #5. Therefore, the Micro-Engine (ME) 710 may be configured to process multiple instructions in parallel in order to increase throughput rather than having to wait for Instruction #1 to retire at Pipe #5.

At Pipe #1, the Micro-Engine (ME) 710 provides the address of the source to the interface blocks for Instruction #1 so that data may be available from the interface blocks for subsequent processing. At the same time, the Micro-Engine (ME) 710 ensues processing another instruction, Instruction #2 at Pipe #1, that is, OpCode, Source and Destination Address are read from the Instruction Memory 850 at Pipe #1.

At Pipe #2, the data for Instruction #1 is now available from the interface blocks. The Instruction #2 is a conditional Jump instruction based on Flags being set for Instruction #1. The Micro-Engine (ME) 710 then ensues processing another instruction, Instruction #3 at Pipe #2, that is, OpCode, Source and Destination Address are read from the Instruction Memory 850 at Pipe #2.

At Pipe #3, the Micro-Engine (ME) 710 processes the data from the interface blocks for Instruction #1. The Micro-Engine (ME) 710 provides the address of the source to the interface blocks for Instruction #3 so that data may be available for subsequent processing. At the same time, the Micro-Engine (ME) 710 also ensues processing another instruction, Instruction #4 at Pipe #3, that is, OpCode, Source and Destination Address are read from the Instruction Memory 850 at Pipe #3.

At Pipe #4, the arithmetic and logical Flags are set for Instruction #1. The data for Instruction #3 is now available from the interface blocks. Meanwhile, the Micro-Engine (ME) 710 provides the address of the source to the interface blocks for Instruction #4 so that data may be available for subsequent processing for Instruction #4. If the Jump condition is False, the Micro-Engine (ME) 710 also ensues processing another instruction, Instruction #5 at Pipe #4, that is, OpCode, Source and Destination Address are read from the Instruction Memory 850 at Pipe #4. However, if the Jump condition is True, then the Micro-Engine (ME) 710 executes the conditional Jump instruction, at Pipe #4, that is, OpCode, Source and Destination Address are read from the Instruction Memory 850 corresponding to Jump Address at Pipe #4.

At Pipe #5, Instruction #1 is retired. If the Jump condition (which is the output of processing Instruction #1 and is available in Pipe #4) is true, the Micro-Engine (ME) 710 flushes the Instruction #3 in Pipe #5. If the Jump condition turns out to be FALSE, then the ME processes the data from the interface blocks for Instruction #3. Meanwhile, the data for Instruction #4 is now available from the interface blocks. If the Jump condition mentioned above is FALSE, then the Micro-Engine (ME) 710 provides the address of the source to the interface blocks for Instruction #5 (which is a sequential instruction) so that data may be available for subsequent processing of that instruction. If the Jump condition mentioned above is true, the Micro-Engine (ME) 710 provides the address of the source to the interface blocks for Instruction corresponding to Jump address so that data may be available for subsequent processing of that instruction.

So if the Jump condition turned out to be true, the ME ends up flushing the two instructions (Instruction #3 and Instruction #4) from the pipeline and the throughput decreases from one instruction per clock to less than one instruction per clock. But if the Jump condition turns out to be false, then there is no flushing of processing pipeline and the ME throughput is one instruction per clock. If the Instruction #2 can be tuned so that the higher probability branch is always that the Jump condition is true, then the performance degradation due to flushing instructions is greatly minimized. In NGIO/InfiniBand™ applications, the ME instruction can be tuned so that normal data processing follows the Jump condition true branch. And since the NGIO/InfiniBand™ applications have been designed to keep error conditions to the minimum because of higher reliability associated with the specification as well as the physical medium, the ME instruction can be tuned so that Error processing follows the Jump condition False branch. Based on this premise, on normal data processing, the ME throughput is still one instruction per clock. This is highly desirable to keep up with the host and the serial side. In processing Error conditions, the throughput is less than one instruction per clock. But the throughput is the least important factor in error processing and factors like reliable recovery, and manageability of error processing takes precedence.

As described with reference to FIG. 12, the Micro-Engine (ME) 710 can handle multiple instructions at any given time correctly even in the event of uncertainty of the next instruction to be executed. The uncertainty of the next instruction to be processed gets exacerbated by the fact that the Micro-Engine (ME) 710 does NOT truly complete processing one instruction in every clock. If one instruction per clock is truly processed, then there is NO non-determinism issue of the next instruction. So the architecture described in this application solves the non-determinism issue even in the face of processing five instructions at any given time.

Figure 13:
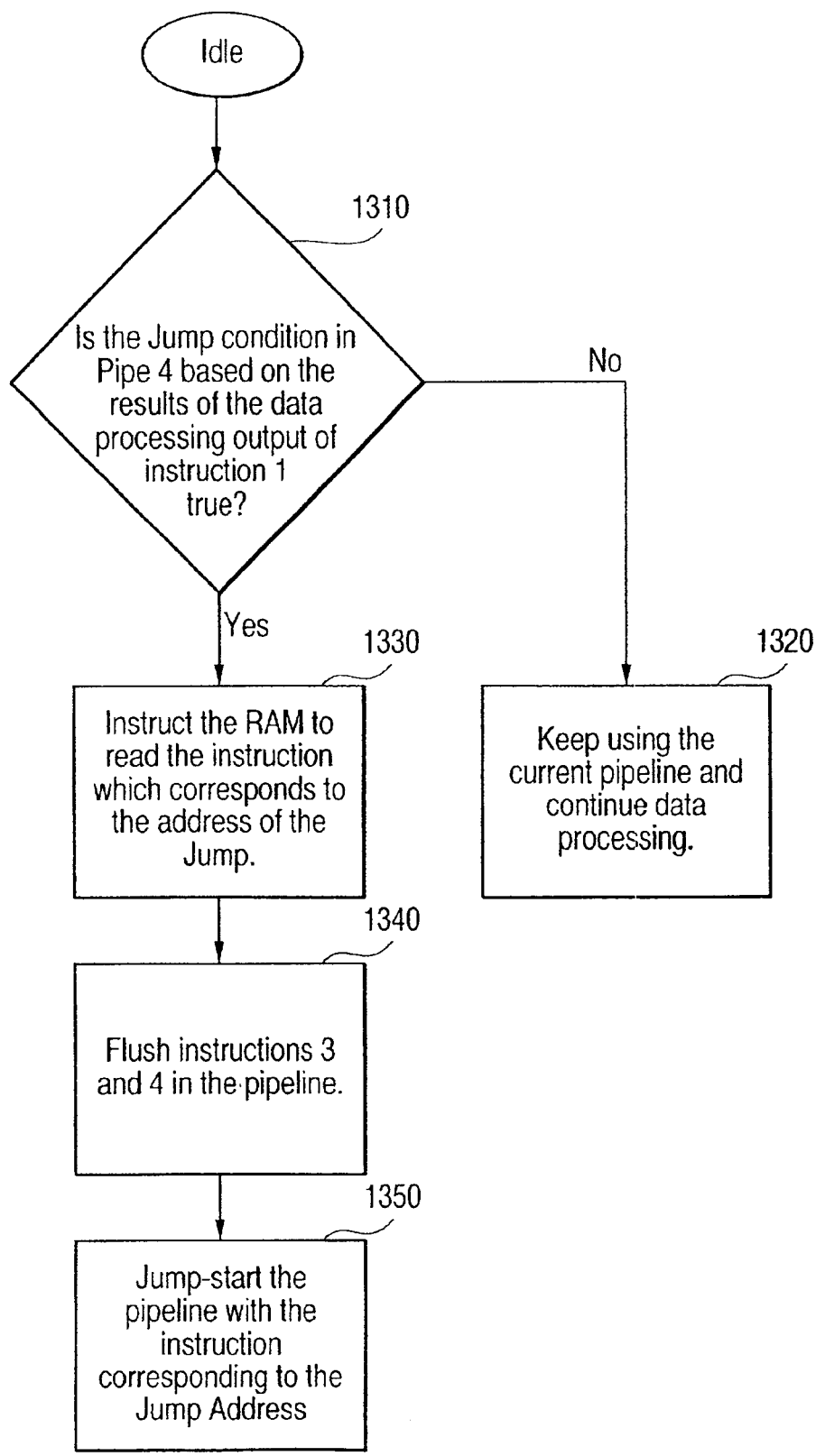
FIG. 13 illustrates an example flow chart of a pipelined instruction execution sequence as shown in FIG. 12.

FIG. 13 illustrates an example flow chart of a Micro-Engine (ME) having a pipelined instruction execution architecture shown in FIG. 12 to ensure that processing pipeline is handled in the case of non-determinism of next instruction to be executed is. As shown in FIG. 13, the Micro-Engine (ME) 710 determines if the Jump condition in Pipe #4 based on the results of the data processing output of Instruction #1 is TRUE at block 1310. If the Jump condition in Pipe #4 based on the results of the data processing output of Instruction #1 is FALSE, the Micro-Engine (ME) 710 keeps on using the current pipeline and continues data processing at block 1320.

However, if the Jump condition in Pipe #4 based on the results of the data processing output of Instruction #1 is TRUE, then the Micro-Engine (ME) 710 instructs the Instruction Memory 850 to read the instruction which corresponds to the Jump Address at block 1330. Next, the Micro-Engine (ME) 710 flushes the Instruction #3, and Instruction #4 in the pipeline at block 1340, and jump-starts the pipeline with the instruction corresponding to the Jump Address at block 1350. This way the Micro-Engine (ME) 710 tries to maintain a throughput of one instruction per clock even in the case of non-determinism of the next instruction to be executed.

Figure 14:
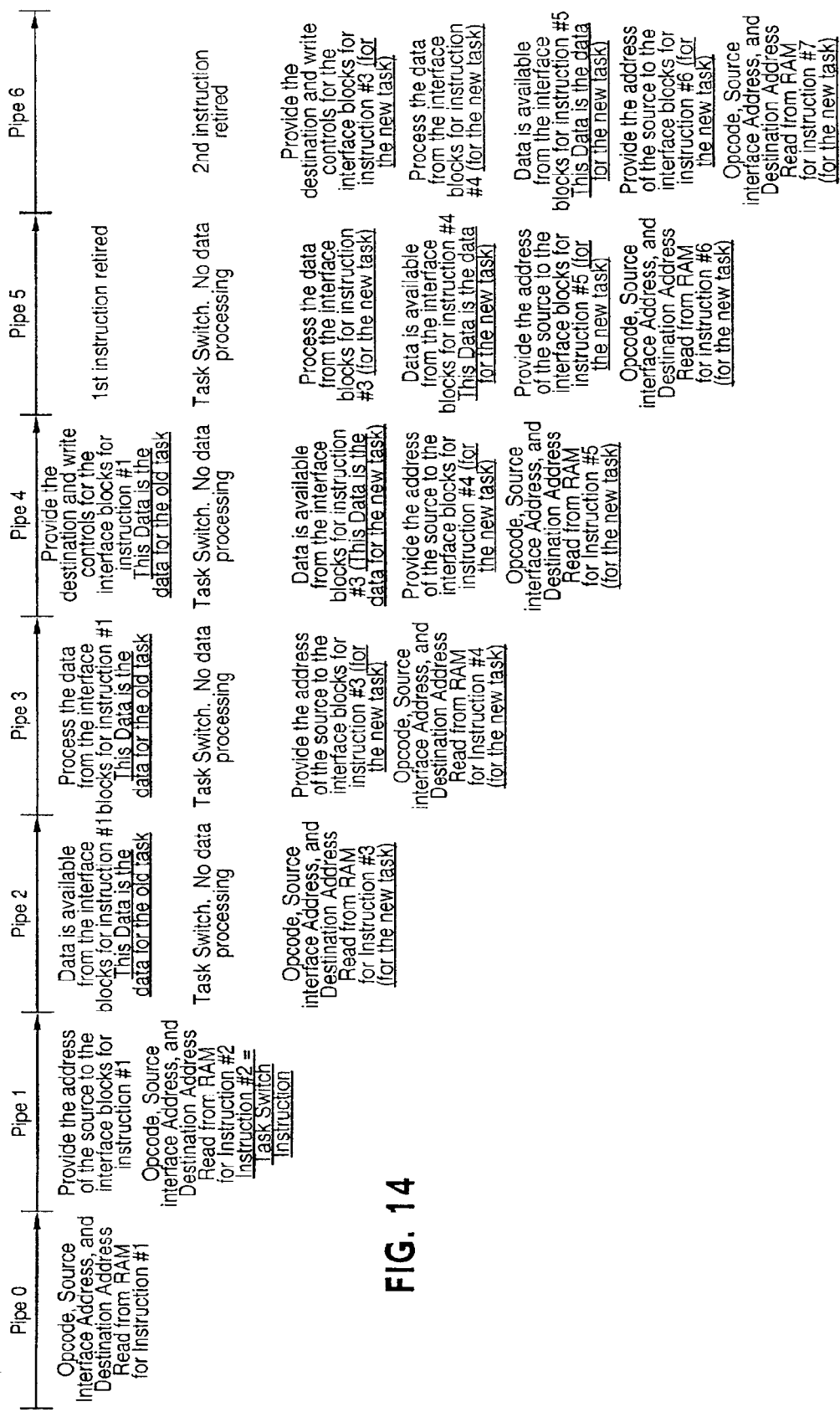
FIG. 14 illustrates an example high level pipelined instruction execution sequence of a Micro-Engine (ME) of a host-fabric adapter according to yet another embodiment of the present invention.

FIG. 14 illustrates an example high level pipelined instruction execution architecture of a Micro-Engine (ME) 710 implemented to process data messages at high speeds, when the Micro-Engine (ME) 710 is set-up to handle multi-tasking (multiple threads). The Micro-Engine (ME) 710 can process multiple tasks (threads) at any given time and ensure that the delays on the host interface 712 of the host-fabric adapter (HCA)130 do not stall the packet processing with minimum hardware overhead.

The Micro-Engine (ME) 710 operates in a pipelined fashion as shown in FIG. 14. Each interface block such as the host interface 712, the address translation interface 714, the VI context memory interface 716, the local bus interface 718, the completion queue/doorbell manager interface 720, and the FIFO interface 722 has a set of registers, which correspond to each task. The registers corresponding to Task "0" are called Task "0" Registers and the registers corresponding to Task "1" are called Task "1" Registers. The first instruction relates to the first task that the Micro-Engine (ME) 710 is currently processing. The Micro-Engine (ME) 710 then gets told to start processing a new task in Instruction #2 by the MicroCode. But the Instruction #1 is still in the pipeline. So the Micro-Engine (ME) 710 makes sure that the data processing corresponding to Instruction #1 completes correctly for Task 0. The Micro-Engine (ME) 710 also makes sure that Task "0" Registers are updated with the processed data, and that the data from the interface blocks are provided from Task "1" Registers for Instruction #3. The Micro-Engine (ME) 710 makes sure that it processes Instruction #3 and updates the status information for the data processing for Instruction #3 for Task "1". The Micro-Engine (ME) 710 also makes sure that the Task "1" Registers are updated on Pipe #6.

Specifically, the Micro-Engine (ME) 710 ensues processing Instruction #1 at Pipe #0, that is, OpCode, Source and Destination Address are read from the Instruction Memory 850 at Pipe #0. Again, Pipe #1, Pipe #2, Pipe #3, and Pipe #4 represent a series of steps taken by the Micro-Engine (ME) 710 before the Instruction #1 is retired at Pipe #5. Therefore, the Micro-Engine (ME) 710 can be configured to process multiple tasks (threads) as well as multiple instructions in parallel. Task switching is a method to increase the ME performance. When the Micro-Engine (ME) 710 is currently processing a data packet, address translations or host transfers may be needed for completing the processing. But whenever any host bus transaction like address translation or host transfer is involved, it takes a lot of cycles to complete the host side transaction. There is no solution to reduce the latency involved with the host side transaction because the latency is fixed and constant for a given host bus. Task switching is one way to alleviate this latency issue. By trying to process another packet in parallel as soon as the current packet processing is stalled because of host bus latency, the host-fabric adapter (HCA) can effectively get more throughput. MicroCode from the Instruction Memory 850 controls the task number that the Micro-Engine (ME) 710 and the interface blocks will work on. For example, if Task "0" is stalled (i.e., waiting for host read data) the MicroCode in a form of a Task Switch Instruction can switch to Task "1" and make progress processing the packet allocated to Task "1".

For example, at Pipe #1, the Micro-Engine (ME) 710 provides the address of the source to the interface blocks for Instruction #1 so that data may be available for subsequent processing. At the same time, the Micro-Engine (ME) 710 ensues processing another instruction, Instruction #2 at Pipe #1, that is, OpCode, Source and Destination Address are read from the Instruction Memory 850 at Pipe #1. However, Instruction #2 is a Task Switch Instruction which requests to switch execution to a different task.

At Pipe #2, the data for Instruction #1 is now available from the interface blocks. This data is the data for the old task. Meanwhile, there is no data operation for Instruction #2 because Instruction #2 is a Task Switching Instruction. The Micro-Engine (ME) 710 ensues processing the instruction corresponding to the new task at Pipe #2, that is, OpCode, Source and Destination Address are read from the Instruction Memory 850 for Instruction #3 at Pipe #2.

At Pipe #3, the Micro-Engine (ME) 710 processes the data from the interface blocks for Instruction #1. Again this data is the data for the old task. Meanwhile, there is no data operation for Instruction #2 because Instruction #2 is a Task Switching Instruction. The Micro-Engine (ME) 710 provides the address of the source to the interface blocks for Instruction #3 for the new task at Pipe #3. The Micro-Engine (ME) 710 also ensues processing another instruction corresponding to the new task at Pipe #3, that is, OpCode, Source and Destination Address are read from the Instruction Memory 850 for Instruction #4 at Pipe #3.

At Pipe #4, the Micro-Engine (ME) 710 provides the destination and write controls of Instruction #1 for the interface blocks for writing the processed data. Again this data is the data for the old task. Meanwhile, there is no data operation for Instruction #2 because Instruction #2 is a Task Switching Instruction. The data for Instruction #3 is now available from the interface blocks. This data is the data for the new task. The Micro-Engine (ME) 710 provides the address of the source to the interface blocks for Instruction #4 for the new task at Pipe #3. The Micro-Engine (ME) 710 also ensues processing another instruction corresponding to the new task at Pipe #4, that is, OpCode, Source and Destination Address are read from the Instruction Memory 850 for Instruction #5 at Pipe #4.

At Pipe #5, Instruction #1 is retired. Meanwhile, there is no data operation for Instruction #2 because Instruction #2 is a Task Switching Instruction. The Micro-Engine (ME) 710 processes the data from the interface blocks for Instruction #3 for the new task. The data for Instruction #4 is now available from the interface blocks for the new task. The Micro-Engine (ME) 710 provides the address of the source to the interface blocks for Instruction #5 for the new task at Pipe #5. The Micro-Engine (ME) 710 also ensues processing another instruction corresponding to the new task at Pipe #5, that is, OpCode, Source and Destination Address are read from the Instruction Memory 850 for Instruction #6 at Pipe #4.

At Pipe #6, Instruction #2, which is a task switching instruction, is retired. The Micro-Engine (ME) 710 provides the destination and write controls of Instruction #3 for the interface blocks for the new task. The Micro-Engine (ME) 710 processes the data from the interface blocks for Instruction #4 for the new task. The data for Instruction #5 is now available from the interface blocks for the new task. The Micro-Engine (ME) 710 provides the address of the source to the interface blocks for Instruction #6 for the new task at Pipe #6. The Micro-Engine (ME) 710 also ensues processing another instruction corresponding to the new task at Pipe #6, that is, OpCode, Source and Destination Address are read from the Instruction Memory 850 for Instruction #7 at Pipe #4.

As can be understood from the above discussion, the task switching operation passes through the pipeline causing minimum intrusion to the data processing. The Micro-Engine (ME) 710 ensures that both the tasks are handled in a graceful manner and data processing for two data packets can happen in parallel in a non-destructive manner. This guarantees that the delays on the host-side of the host-fabric adapter (HCA) do not stall the packet processing. The usual approach of implementing multiple tasks (threads) in a data processing subsystem involves dedicating hardware resources like processing units per task. Because of these dedicated units, the hardware of those multi-threaded data processing units are highly complex and involves lot more area on the chip. This translates to larger die, higher chip costs, higher power consumption and increased verification complexity. This task switching circuitry described in this application is achieved with minimum hardware overhead and gracefully integrated into normal processing ME pipeline.

As described from the foregoing, the host-fabric adapter installed at a host system in a data network using a channel-based, switched fabric architecture according to an embodiment of the present invention effectively manages NGIO/InfiniBand™ channels and support data movement operations between communication devices at a host system or between host systems connected together directly or via a data network using a channel-based, switched fabric architecture. The host-fabric adapter is optimized for NGIO/InfiniBand™ functionality with minimal hardware investment, including controlling execution of NGIO/InfiniBand™ protocols with minimal pipelining. Micro-control subsystem of the host-fabric adapter is designed to control execution of NGIO/InfiniBand™ protocols with minimal pipelining. Context memory can be optimized for memory bandwidth while preserving the overall data transfer rate. Registers of different sizes may be arranged to create a context memory based on system architecture requirements. Both minimum area and maximum bandwidth of a large amount of registers in micro controller architectures can be obtained in order to increase performance of network controllers in the (NGIO/InfiniBand™) Network Interface chip.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention For example, the present invention is applicable to all types of data networks, including, but is not limited to, a local area network (LAN), a wide area network (WAN), a campus area network (CAN), a metropolitan area network (MAN), a global area network (GAN) and a system area network (SAN) using Next Generation I/O (NGIO), Future I/O (FIO), InfiniBand™ and Server Net, and a LAN system including Ethernet, FDDI (Fiber Distributed Data Interface) Token Ring LAN, Asynchronous Transfer Mode (ATM) LAN, Fiber Channel, and Wireless LAN. Further, many other modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A host-fabric adapter, comprising:
    at least one Micro-Engine (ME) arranged to establish connections and support data transfers, via a switched fabric, in response to work requests from a host system for data transfers;
    interface blocks arranged to interface said switched fabric and said host system, and send/receive work requests and/or data for data transfers, via said switched fabric, and configured to provide context information needed for said Micro-Engine (ME) to process said work requests for data transfers, via said switched fabric,
    wherein said Micro-Engine (ME) is implemented with a pipelined instruction execution architecture to handle one or more ME instructions and/or one or more tasks so as to process data for data transfers;
    wherein said Micro-Engine (ME) processes multiple ME instructions in parallel, when said ME instructions are deterministic logic and arithmetic instructions by:
    processing a first instruction at a first cycle in which an OpCode, source address and destination address are read from an Instruction Memory;
    providing a source address to the interface blocks for the first instruction at a second cycle, and processing a second instruction in which the OpCode, source address and destination address are read from the Instruction Memory;
    when data for the first instruction is available from the interface blocks at a third cycle, providing the source address to the interface blocks for the second instruction, and processing a third instruction in which the OpCode, source address and destination address are read from the Instruction Memory;
    processing data messages from the interface blocks for the first instruction at a fourth cycle, and when data for the second instruction is available from the interface blocks, providing the source address to the interface blocks for the third instruction and processing a fourth instruction in which the OpCode, source address and destination address are read from the Instruction Memory;
    providing destination and write controls of the first instruction for the interface blocks at a fifth cycle, processing data messages from the interface blocks for the second instruction and when data for the third instruction is available from the interface blocks, providing the source address to the interface blocks for the fourth instruction and processing a fifth instruction in which the OpCode, source address and destination address are read from the Instruction Memory; and
    when the first instruction is retired at a sixth cycle, providing destination and write controls of the second instruction for the interface blocks, processing the data from the interface blocks for the third instruction, and when data for the fourth instruction is available from the interface blocks, providing the source address to the interface blocks for the fifth instruction and processing a sixth instruction in which the OpCode, source address and destination address are read from the Instruction Memory.

2. The host-fabric adapter as claimed in claim 1, wherein said Micro-Engine (ME) is configured to ensure that only latest data from the interface blocks is used and correct data is written to the interface blocks.

3. The host-fabric adapter as claimed in claim 1, wherein said interface blocks comprises:
- a serial interface arranged to receive and transmit data from said switched fabric for data transfers;
- a host interface arranged to receive and transmit work requests, in the form of work queue elements (WQEs), from said host system for data transfers;
- a context memory arranged to store context information needed for said Micro-Engine (ME) to process work requests for data transfers;
- a first-in/first-out (FIFO) interface arranged to receive data from said switched fabric via said serial interface, and to transmit data to said switched fabric via said serial interface;
- an address translation interface arranged for address translation from said Micro-Engine (ME);
- a local bus interface arranged to support system accessible context connections and data transfers; and
- a completion queue/doorbell manager interface arranged to provide an interface to completion queues, and to update the context information needed for said Micro-Engine (ME) to process work requests for data transfers.

4. The host-fabric adapter as claimed in claim 1, wherein said Micro-Engine (ME) comprises:
- one or more Data Multiplexers arranged to supply appropriate interface data based on an ME instruction;
- an Instruction Memory arranged to provide said ME instruction based on downloadable MicroCode;
- an Arithmetic Logic Unit (ALU) arranged to perform mathematical, logical and shifting operations, and supply write data to a host interface, an address translation interface, a context memory interface, a local bus interface, a completion queue/doorbell manager interface, and a FIFO interface, via a system data bus; and
- an Instruction Decoder arranged to supply system controls to the host interface, the address translation interface, the context memory interface, the local bus interface, the completion queue/doorbell manager interface, and the FIFO interface, via a system control bus, to execute said ME instruction from said Instruction Memory to control operations of said Data Multiplexers, and to determine functions of said Arithmetic Logic Unit (ALU).

5. The host-fabric adapter as claimed in claim 4, wherein said Instruction Memory corresponds to a random-access-memory (RAM) provided to store MicroCode that are downloadable for providing said ME instruction to said Instruction Decoder.

6. The host-fabric adapter as claimed in claim 5, wherein said Micro-Engine (ME) and said interface blocks are implemented as part of an Application Specific Integrated Circuit (ASIC).

7. A host-fabric adapter, comprising:
- at least one Micro-Engine (ME) arranged to establish connections and support data transfers, via a switched fabric, in response to work requests from a host system for data transfers;
- interface blocks arranged to interface said switched fabric and said host system, and send/receive work requests and/or data for data transfers, via said switched fabric, and configured to provide context information needed for said Micro-Engine (ME) to process said work requests for data transfers, via said switched fabric,
- wherein said Micro-Engine (ME) is implemented with a pipelined instruction execution architecture to handle one or more ME instructions and/or one or more tasks so as to process data for data transfers;
- wherein said Micro-Engine (ME) processes multiple ME instructions in parallel, when said ME instructions are non-deterministic logic and arithmetic instructions by:
- processing a first instruction at a first cycle in which an OpCode, source address and destination address are read from an Instruction Memory;
- providing the source address to the interface blocks for the first instruction at a second cycle, and processing a second instruction in which the OpCode, source address and destination address are read from the Instruction Memory;
- when data for the first instruction is available from the interface blocks at a third cycle, and a conditional Jump instruction based on Flags is set for the first instruction, processing a third instruction in which the OpCode, source address and destination address are read from the Instruction Memory;
- processing data from the interface blocks for the first instruction at a fourth cycle, providing the source address to the interface blocks for the third instruction processing a fourth instruction in which the OpCode, source address and destination address are read from the Instruction Memory;
- when data for the third instruction is available from the interface blocks at a fifth cycle, providing destination and write controls of the fourth instruction for the interface blocks;
- if the Jump condition is not TRUE, processing a fifth instruction in which the OpCode, source address and destination address are read from the Instruction Memory;
- if the Jump condition is TRUE, processing the conditional Jump instruction in which the OpCode, source address and destination address are read from the Instruction Memory corresponding to a Jump Address;
- when the first instruction is retired at a sixth cycle, flushing the third instruction and data for the fourth instruction available from the interface blocks, and providing the source address to the interface blocks for the conditional Jump instruction corresponding to the Jump Address if the Jump condition is TRUE; and
- if the Jump condition is FALSE, providing the source address to the interface blocks for the fifth instruction and processing the conditional Jump instruction in which the OpCode, source address and destination address are read from the Instruction Memory corresponding to the Jump Address.

8. The host-fabric adapter as claimed in claim 7, wherein said Micro-Engine (ME) is configured to ensure that only latest data from the interface blocks is used and correct data is written to the interface blocks.

9. The host-fabric adapter as claimed in claim 7, wherein said Micro-Engine (ME) comprises:
- one or more Data Multiplexers arranged to supply appropriate interface data based on an ME instruction;
- an Instruction Memory arranged to provide said ME instruction based on downloadable MicroCode;

an Arithmetic Logic Unit (ALU) arranged to perform mathematical, logical and shifting operations, and supply write data to a host interface, an address translation interface, a context memory interface, a local bus interface, a completion queue/doorbell manager interface, and a FIFO interface, via a system data bus; and an Instruction Decoder arranged to supply system controls to the host interface, the address translation interface, the context memory interface, the local bus interface, the completion queue/doorbell manager interface, and the FIFO interface, via a system control bus, to execute said ME instruction from said Instruction Memory to control operations of said Data Multiplexers, and to determine functions of said Arithmetic Logic Unit (ALU).

10. The host-fabric adapter as claimed in claim 9, wherein the Instruction Memory corresponds to a random-access-memory (RAM) provided to store MicroCode that are downloadable for providing the ME instruction to the Instruction Decoder.

11. The host-fabric adapter as claimed in claim 10, wherein the Micro-Engine (ME) and the appropriate interface are implemented as part of an Application Specific Integrated Circuit (ASIC).

12. A host-fabric adapter, comprising:

at least one Micro-Engine (ME) arranged to establish connections and support data transfers, via a switched fabric, in response to work requests from a host system for data transfers;

interface blocks arranged to interface said switched fabric and said host system, and send/receive work requests and/or data for data transfers, via said switched fabric, and configured to provide context information needed for said Micro-Engine (ME) to process said work requests for data transfers, via said switched fabric, wherein said Micro-Engine (ME) is implemented with a pipelined instruction execution architecture to handle one or more ME instructions and/or one or more tasks so as to process data for data transfers;

wherein said Micro-Engine (ME) processes multiple tasks in parallel by:

processing a first instruction at a first cycle in which an OpCode, source address and destination address are read from an Instruction Memory;

providing the source address to the interface blocks for the first instruction at a second cycle, and processing a second instruction indicating a Task Switching Instruction in which the OpCode, source address and destination address are read from the Instruction Memory;

when data for the first instruction is available from the interface blocks and there is no data processing at a third cycle, processing a third instruction for a new task in which the OpCode, source address and destination address are read from the Instruction Memory;

processing data for the first instruction from the interface blocks at a fourth cycle and providing the source address to the interface blocks for the third instruction for the new task;

providing destination and write controls of the first instruction for the interface blocks at a fifth cycle and, when data for the new task for the third instruction is available from the interface blocks, providing the source address to the interface blocks for a fourth instruction and processing a fifth instruction for the new task in which the OpCode, source address and destination address are read from the Instruction Memory;

when the first instruction is retired at a sixth cycle, processing data from the interface blocks for the third instruction for the new task, and when data for the new task for the fourth instruction is available from the interface blocks, providing the source address to the interface blocks for the fifth instruction and processing a sixth instruction for the new task in which the OpCode, source address and destination address are read from the Instruction Memory; and when the second instruction is retired at a seventh cycle, providing destination and write controls for the interface blocks for the third instruction, processing data from the interface blocks for the fourth instruction for the new task, and when data for the new task for the fifth instruction is available from the interface blocks, providing the source address to the interface blocks for the sixth instruction and processing a seventh instruction for the new task in which the OpCode, source address and destination address are read from the Instruction Memory.

13. The host-fabric adapter as claimed in claim 12, wherein said Micro-Engine (ME) is configured to ensure that only latest data from the interface blocks is used and correct data is written to the interface blocks.

14. The host-fabric adapter as claimed in claim 12, wherein said Micro-Engine (ME) comprises:

one or more Data Multiplexers arranged to supply appropriate interface data based on an ME instruction;

an Instruction Memory arranged to provide said ME instruction based on downloadable MicroCode;

an Arithmetic Logic Unit (ALU) arranged to perform mathematical, logical and shifting operations, and supply write data to a host interface, an address translation interface, a context memory interface, a local bus interface, a completion queue/doorbell manager interface, and a FIFO interface, via a system data bus; and an Instruction Decoder arranged to supply system controls to the host interface, the address translation interface, the context memory interface, the local bus interface, the completion queue/doorbell manager interface, and the FIFO interface, via a system control bus, to execute said ME instruction from said Instruction Memory to control operations of said Data Multiplexers, and to determine functions of said Arithmetic Logic Unit (ALU).

15. The host-fabric adapter as claimed in claim 14, wherein said Micro-Engine (ME) and said appropriate interface are implemented as part of an Application Specific Integrated Circuit (ASIC).

16. A host-fabric adapter installed at a host system for connecting to a switched fabric of a data network, comprising:

at least one Micro-Engine (ME) arranged to establish connections and support data transfers via said switched fabric;

a serial interface arranged to receive and transmit data from said switched fabric for data transfers;

a host interface arranged to receive and transmit work requests from said host system for data transfers; and a context memory interface arranged to store context information needed for said Micro-Engine (ME) to process work requests for data transfers, wherein said Micro-Engine (ME) is implemented with a pipelined instruction execution architecture to handle one or more ME instructions and/or one or more tasks in parallel so as to process data for data transfers;

wherein said Micro-Engine (ME) processes multiple ME instructions in parallel, when said ME instructions are deterministic logic and arithmetic instructions by:

processing a first instruction at a first cycle in which an OpCode, source address and destination address are read from an Instruction Memory;

providing a source address to the interface blocks for Instruction #1 at a second cycle, and processing a second instruction in which the OpCode, source address and destination address are read from the Instruction Memory;

when data for the first instruction is available from the interface blocks at a third cycle, providing the source address to the interface blocks for the second instruction, and processing a third instruction in which the OpCode, source address and destination address are read from the Instruction Memory;

processing data messages from the interface blocks for the first instruction at a fourth cycle, and when data for the second instruction is available from the interface blocks, providing the source address to the interface blocks for the third instruction and processing a fourth instruction in which the OpCode, source address and destination address are read from the Instruction Memory;

providing destination and write controls of the first instruction for the interface blocks at a fifth cycle, processing data messages from the interface blocks for the second instruction, and when data for the third instruction is available from the interface blocks, providing the source address to the interface blocks for the fourth instruction and processing a fifth instruction in which the OpCode, source address and destination address are read from the Instruction Memory; and when the first instruction is retired at a sixth cycle, providing destination and write controls of the second instruction for the interface blocks, processing the data from the interface blocks for the third instruction, and when data for the fourth instruction is available from the interface blocks, providing the source address to the interface blocks for the fifth instruction and processing a sixth instruction in which the OpCode, source address and destination address are read from the Instruction Memory.

17. The host-fabric adapter as claimed in claim 16, wherein said Micro-Engine (ME) is configured to ensure that only latest data from the interface blocks is used and correct data is written to the interface blocks.

18. A host-fabric adapter installed at a host system for connecting to a switched fabric of a data network, comprising:

at least one Micro-Engine (ME) arranged to establish connections and support data transfers via said switched fabric;

a serial interface arranged to receive and transmit data from said switched fabric for data transfers;

a host interface arranged to receive and transmit work requests from said host system for data transfers; and a context memory interface arranged to store context information needed for said Micro-Engine (ME) to process work requests for data transfers, wherein said Micro-Engine (ME) is implemented with a pipelined instruction execution architecture to handle one or more MB instructions and/or one or more tasks in parallel so as to process data for data transfers;

wherein said Micro-Engine (ME) processes multiple ME instructions in parallel, when said ME instructions are non-deterministic logic and arithmetic instructions by:

processing a first instruction at a first cycle in which an OpCode, source address and destination address are read from an Instruction Memory;

providing the source address to the interface blocks for the first instruction at a second cycle, and processing a second instruction in which the OpCode, source address and destination address are read from the Instruction Memory;

when data for the first instruction is available from the interface blocks at a third cycle, and a conditional Jump instruction based on Flags is set for the first instruction, processing a third instruction in which the OpCode, source address and destination address are read from the Instruction Memory;

processing data from the interface blocks for the first instruction at a fourth cycle, providing the source address to the interface blocks for the third instruction, processing a fourth instruction in which the OpCode, source address and destination address are read from the Instruction Memory;

when data for the third instruction is available from the interface blocks at a fifth cycle, providing destination and write controls of the fourth instruction for the interface blocks;

if the Jump condition is not TRUE, processing a fifth instruction in which the OpCode, source address and destination address are read from the Instruction Memory;

if the Jump condition is TRUE, processing the conditional Jump instruction in which the OpCode, source address and destination address are read from the Instruction Memory corresponding to a Jump Address;

when the first instruction is retired at a sixth cycle, flushing the third instruction and data for the fourth instruction available from the interface blocks, and providing the source address to the interface blocks for the conditional Jump instruction corresponding to the Jump Address if the Jump condition is TRUE; and if the Jump condition is FALSE, providing the source address to the interface blocks for the fifth instruction and processing the conditional Jump instruction in which the OpCode, source address and destination address are read from the Instruction Memory corresponding to the Jump Address.

19. The host-fabric adapter as claimed in claim 18, wherein said Micro-Engine (ME) is configured to ensure that only latest data from the interface blocks is used and correct data is written to the interface blocks.

20. A host-fabric adapter installed at a host system for connecting to a switched fabric of a data network, comprising:

at least one Micro-Engine (ME) arranged to establish connections and support data transfers via said switched fabric;

a serial interface arranged to receive and transmit data from said switched fabric for data transfers;

a host interface arranged to receive and transmit work requests from said host system for data transfers; and a context memory interface arranged to store context information needed for said Micro-Engine (ME) to process work requests for data transfers, wherein said Micro-Engine (ME) is implemented with a pipelined instruction execution architecture to handle one or more ME instructions and/or one or more tasks in parallel so as to process data for data transfers;

wherein said Micro-Engine (ME) processes multiple tasks in parallel by:

processing a first instruction at a first cycle in which an OpCode, source address and destination address are read from an Instruction Memory;

providing the source address to the interface blocks for the first instruction at a second cycle, and processing a second instruction indicating a Task Switching Instruction in which the OpCode, source address and destination address are read from the Instruction Memory;

when data for the first instruction is available from the interface blocks and there is no data processing at a third cycle, processing a third instruction for a new task in which the OpCode, source address and destination address are read from the Instruction Memory;

processing data for the first instruction from the interface blocks at a fourth cycle and providing the source address to the interface blocks for the third instruction for the new task;

providing destination and write controls of the first instruction for the interface blocks at a fifth cycle and, when data for the new task for the third instruction is available from the interface blocks, providing the source address to the interface blocks for a fourth instruction and processing a fifth instruction for the new task in which the OpCode, source address and destination address are read from the Instruction Memory;

when the first instruction is retired at a sixth cycle, processing data from the interface blocks for the third instruction for the new task, and when data for the new task for the fourth instruction is available from the interface blocks, providing the source address to the interface blocks for the fifth instruction and processing a sixth instruction for the new task in which the OpCode, source address and destination address are read from the Instruction Memory; and when the second instruction is retired at a seventh cycle, providing destination and write controls for the interface blocks for the third instruction, processing data from the interface blocks for the fourth instruction for the new task, and when data for the new task for the fifth instruction is available from the interface blocks, providing the source address to the interface blocks for the sixth instruction and processing a seventh instruction for the new task in which the OpCode, source address and destination address are read from the Instruction Memory.

21. The host-fabric adapter as claimed in claim 20, wherein said Micro-Engine (ME) is configured to ensure that only latest data from the interface blocks is used and correct data is written to the interface blocks.

22. The host-fabric adapter as claimed in claim 20, wherein said Micro-Engine (ME) comprises:

one or more Data Multiplexers arranged to supply appropriate interface data based on an ME instruction;

an Instruction Memory arranged to provide said ME instruction based on downloadable MicroCode;

an Arithmetic Logic Unit (ALU) arranged to perform mathematical, logical and shifting operations, and supply write data to a host interface an address translation interface a context memory interface a local bus interface, a completion queue/doorbell manager interface, and a FIFO interface, via a system data bus; and an Instruction Decoder arranged to supply system controls to the host interface, the address translation interface, the context memory interface, the local bus interface, the completion queue/doorbell manager interface, and the FIFO interface, via a system control bus, to execute said ME instruction from said Instruction Memory to control operations of said Data Multiplexers, and to determine functions of said Arithmetic Logic Unit (ALU).

23. The host-fabric adapter as claimed in claim 22, wherein the Instruction Memory corresponds to a random-access-memory (RAM) provided to store MicroCode that are downloadable for providing the ME instruction to the Instruction Decoder.

24. The host-fabric adapter as claimed in claim 23 wherein the Micro-Engine (ME) and the appropriate interface are implemented as part of an Application Specific Integrated Circuit (ASIC).

* * * * *